US012278582B2

(12) United States Patent
Mori et al.

(10) Patent No.: US 12,278,582 B2
(45) Date of Patent: Apr. 15, 2025

(54) CONTROLLER FOR ROTARY MACHINE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 40 days.

(21) Appl. No.: 18/270,054

(22) PCT Filed: Mar. 1, 2021

(86) PCT No.: PCT/JP2021/007718
§ 371 (c)(1),
(2) Date: Jun. 28, 2023

(87) PCT Pub. No.: WO2022/185381
PCT Pub. Date: Sep. 9, 2022

(65) Prior Publication Data
US 2024/0063746 A1 Feb. 22, 2024

(51) Int. Cl.
*H02P 27/12* (2006.01)
*B62D 5/04* (2006.01)

(52) U.S. Cl.
CPC .............. *H02P 27/12* (2013.01); *B62D 5/046* (2013.01)

(58) Field of Classification Search
CPC ...... H02P 27/12; H02P 29/50; H02P 21/0025; H02P 25/22; B62D 5/046
USPC ................ 318/801, 800, 799, 798, 767, 727
See application file for complete search history.

(56) References Cited

U.S. PATENT DOCUMENTS

| 9,859,823 B2 * | 1/2018 | Roesner | H02P 6/12 |
| 2011/0221375 A1 | 9/2011 | Suzuki | |
| 2019/0047613 A1 | 2/2019 | Kano et al. | |

FOREIGN PATENT DOCUMENTS

| JP | 4941686 B2 | 5/2012 |
| JP | 2020-137233 A | 8/2020 |
| WO | 2017/141593 A1 | 8/2017 |

OTHER PUBLICATIONS

International Search Report for PCT/JP2021/007718 dated May 11, 2021.
Written Opinion for PCT/JP2021/007718 dated May 11, 2021.

* cited by examiner

*Primary Examiner* — David Luo
(74) *Attorney, Agent, or Firm* — Suchrue Mion, PLLC

(57) ABSTRACT

To provide a controller for rotary machine which can reduce the effective value of the bus line AC component, by utilizing the degree of freedom that two set of armature windings and two sets of inverters are provided, without necessity to synchronize the on/off control timing of the switching devices of first set, and the on/off control timing of the switching devices of second set. A controller for rotary machine calculates the utilization factor setting command which makes the utilization factor ratio change from 1 to 1 so that an effective value of a bus line AC component which is an AC component superimposed on a bus current which flows through a bus line connecting between the DC power source and the two set of inverters becomes lower than a case where the utilization factor ratio is 1 to 1.

17 Claims, 21 Drawing Sheets

FIG. 8
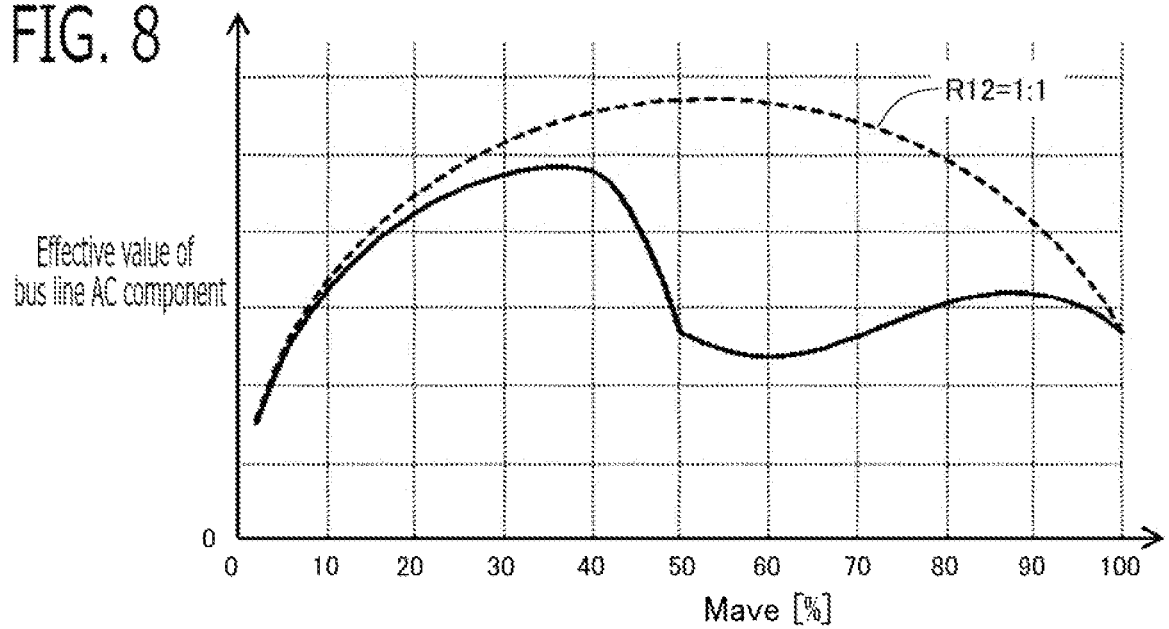
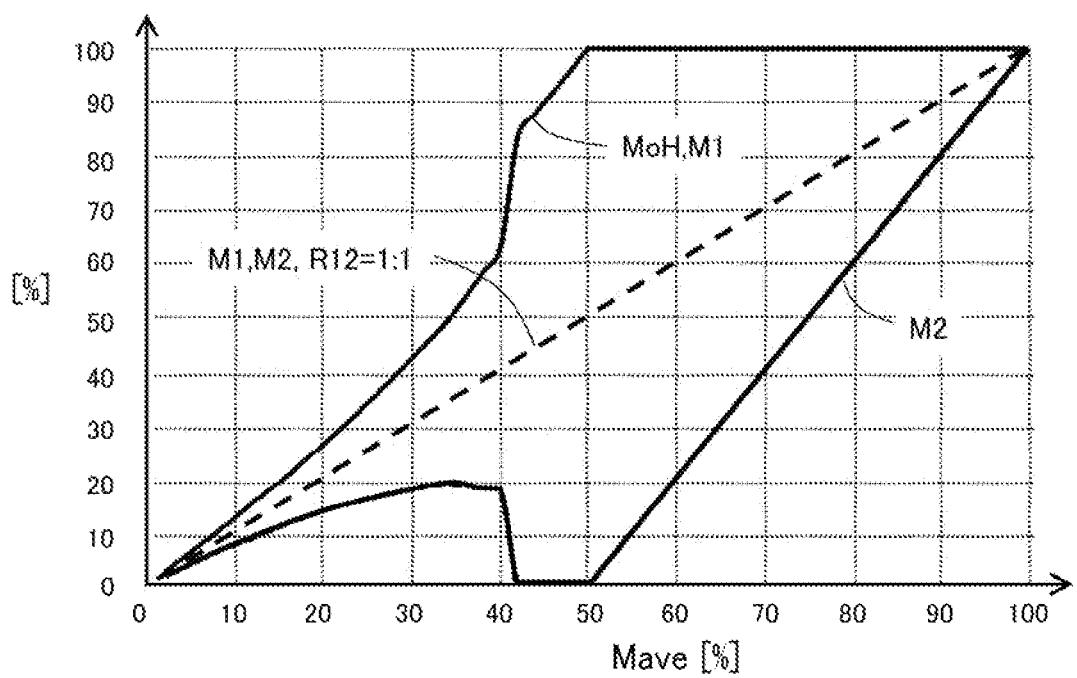

FIG. 9
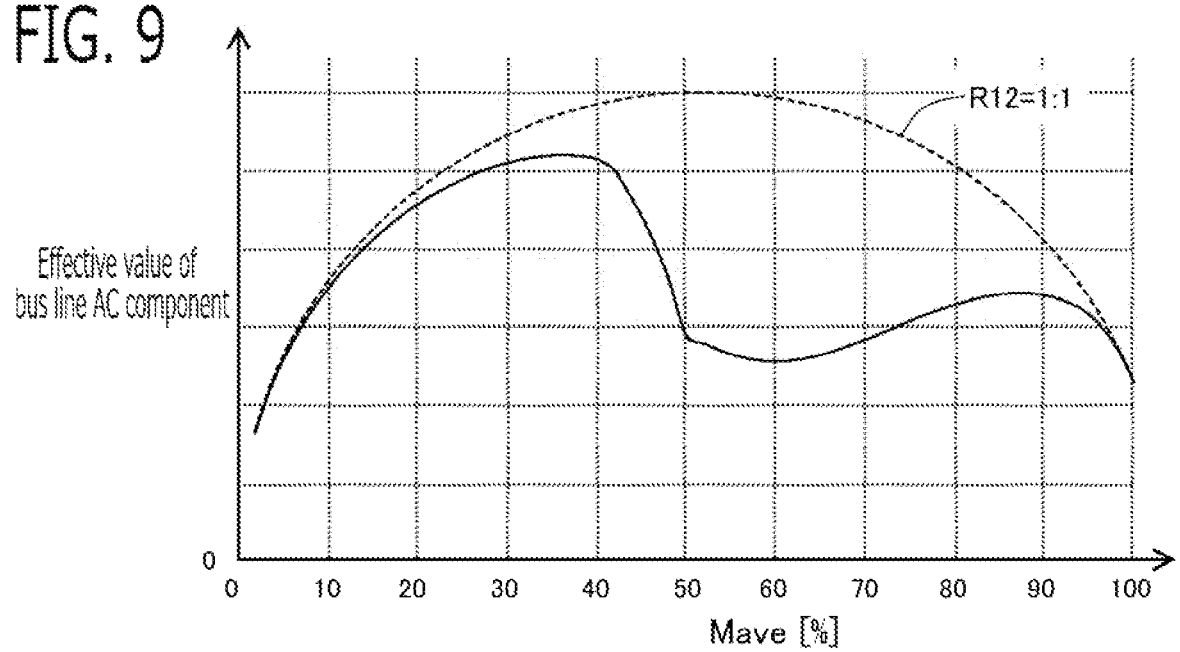
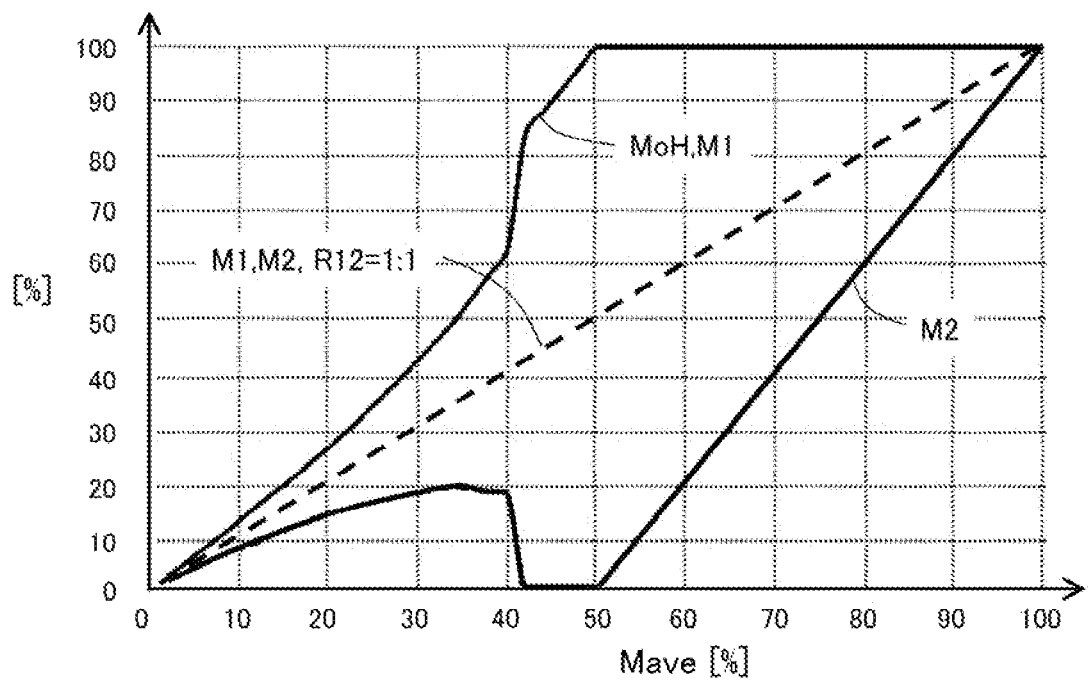

FIG. 19
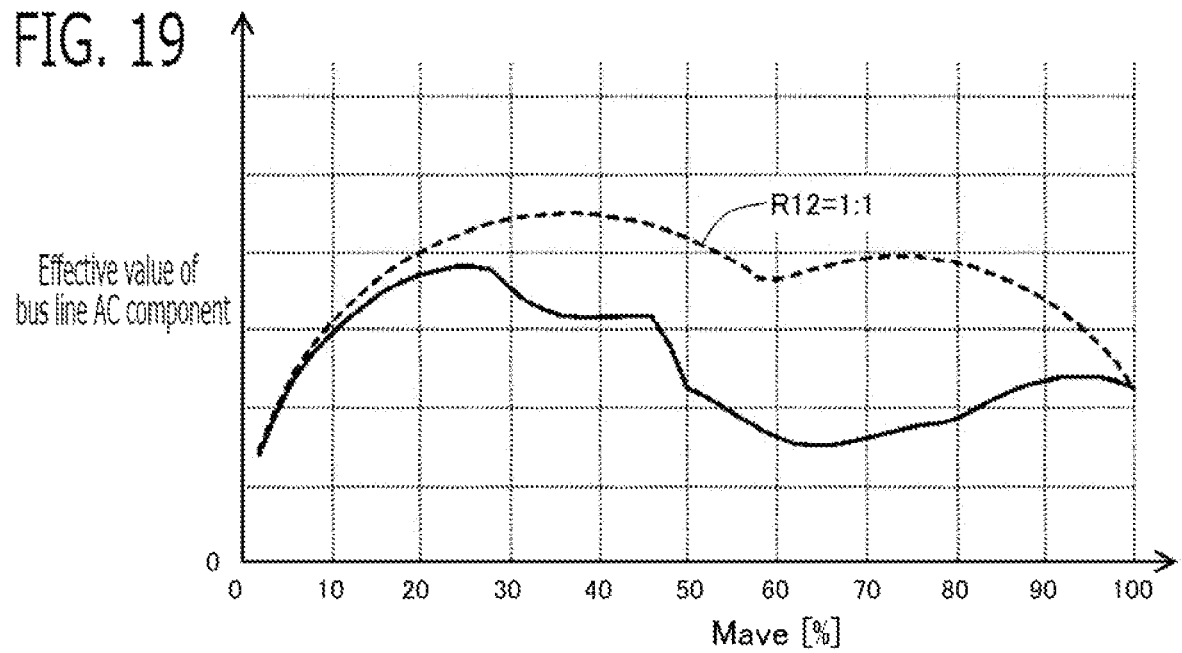
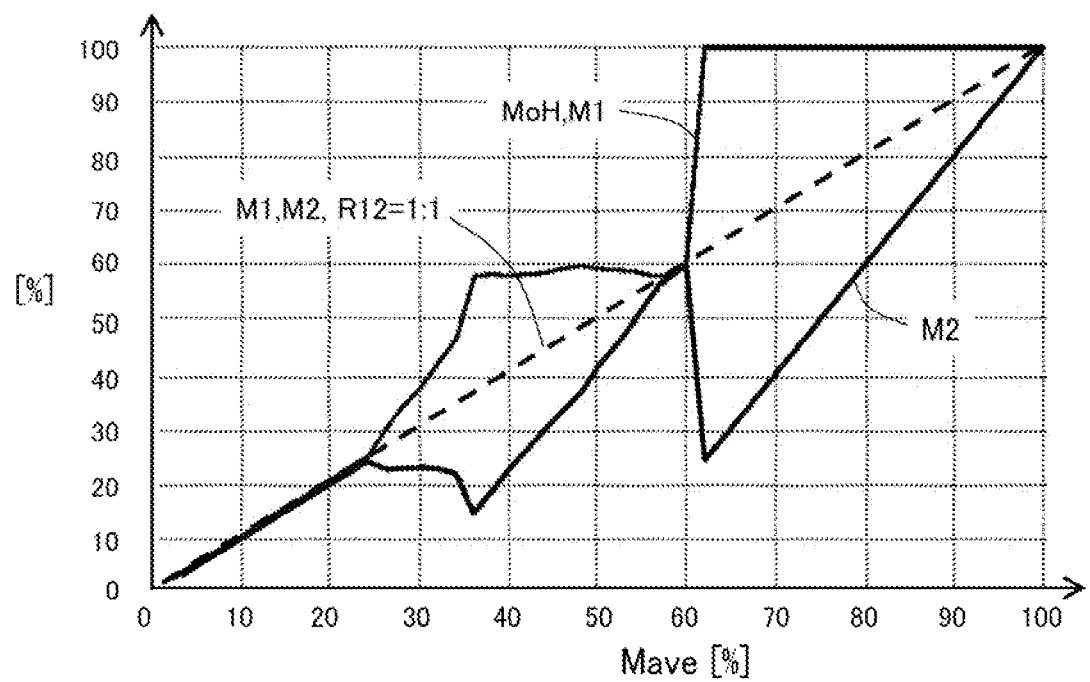

FIG. 20
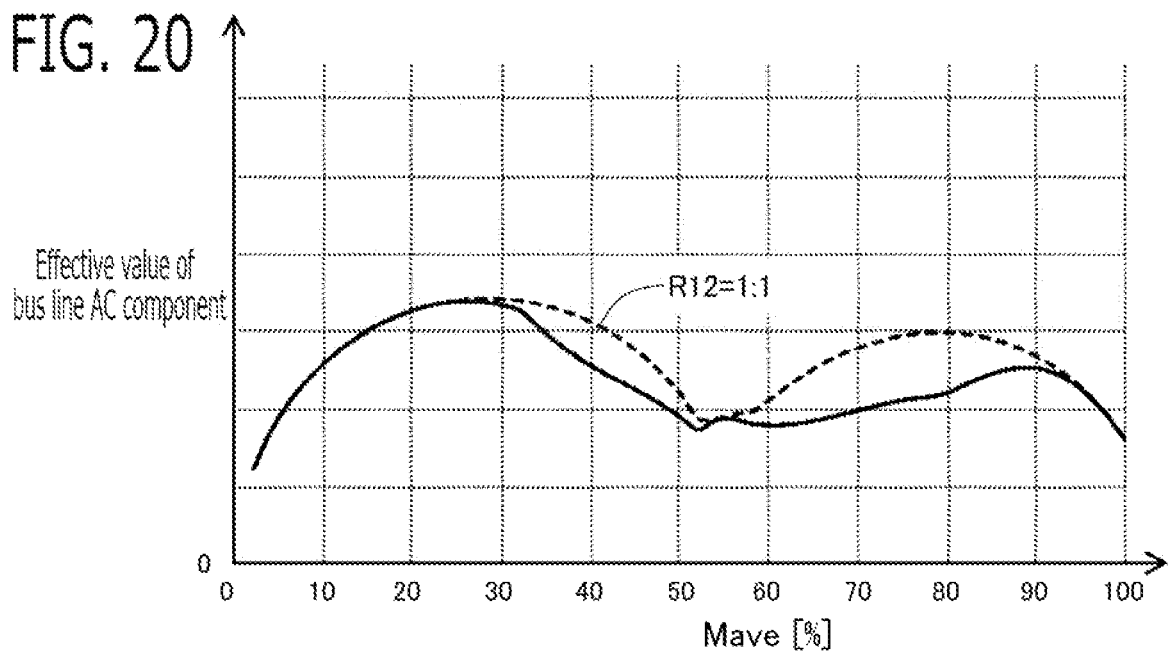
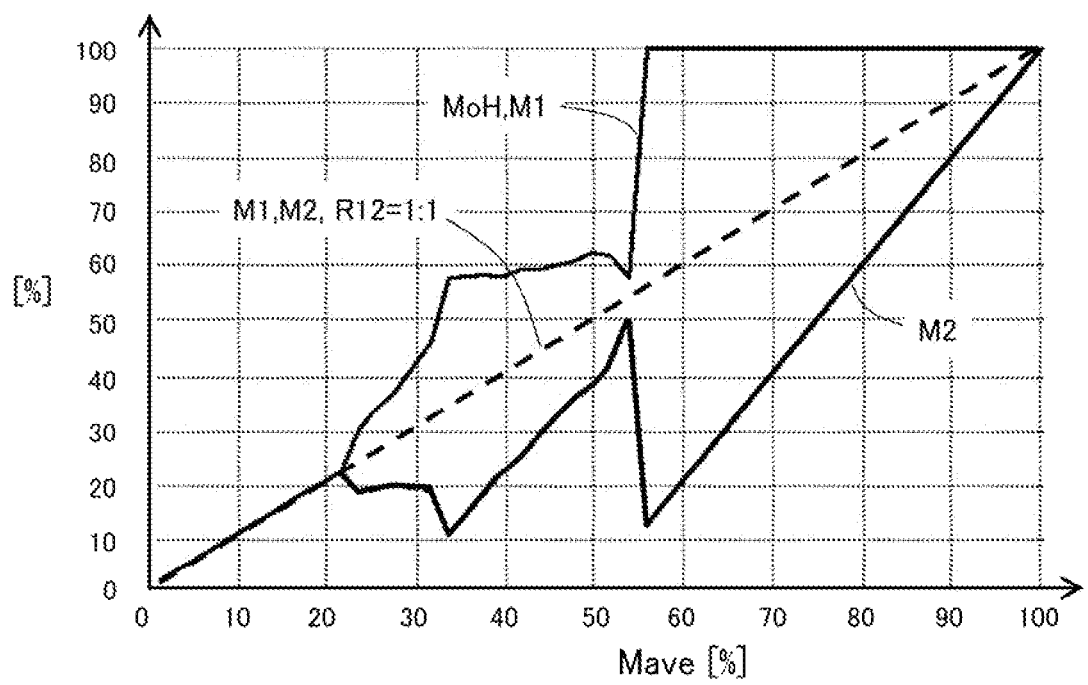

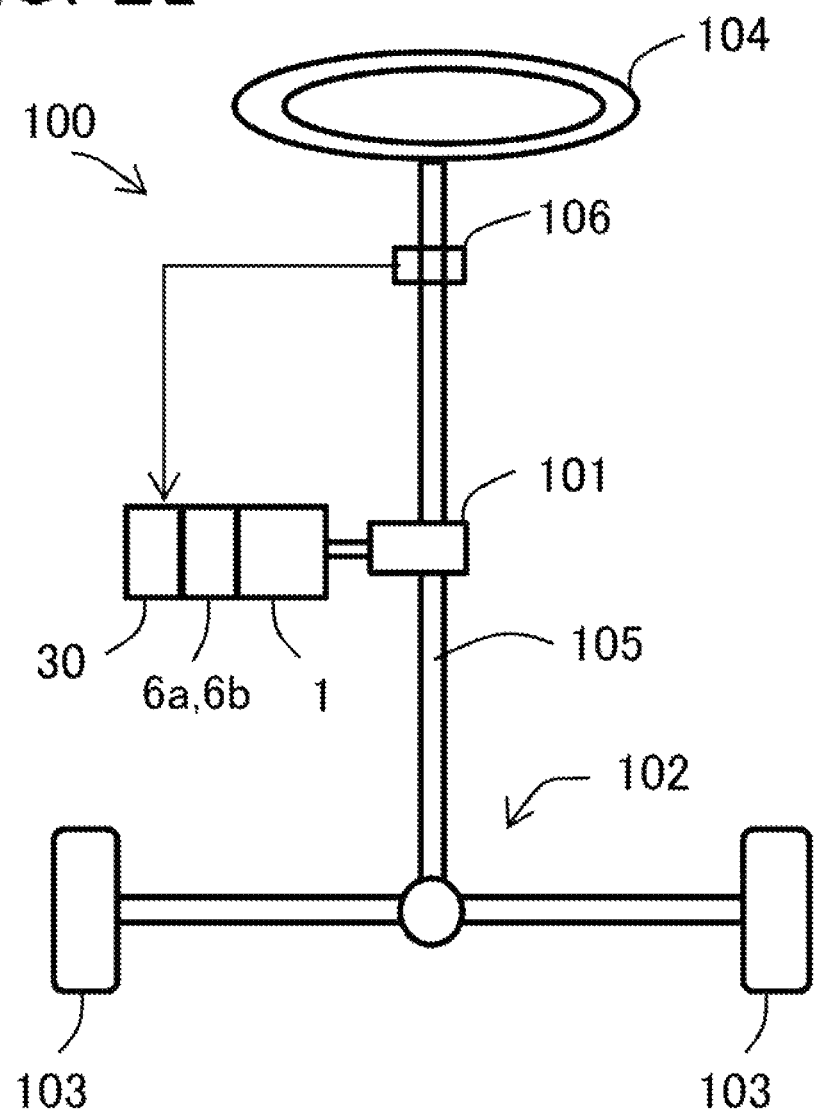

CONTROLLER FOR ROTARY MACHINE

CROSS REFERENCE TO RELATED APPLICATIONS

This application is a National Stage of International Application No. PCT/JP2021/007718 filed Mar. 1, 2021.

TECHNICAL FIELD

The present disclosure relates to a controller for rotary machine.

BACKGROUND ART

A system which drives the rotary machine which has two sets of plural-phase armature windings by two sets of inverters is proposed, and it is employed for an elevator, an electric power steering, and the like.

In patent document 1, the rotary machine is provided with the two sets of three-phase armature windings, the voltage command values to one set of the three-phase armature windings is shifted to the high potential side from the center value of the applicable range, and the voltage command value to the other set of the three-phase armature windings is shifted to the low potential side from the center value. Accordingly, it can be suppressed that the on-off pattern (voltage vector) which turns on and off the switching devices of the first set of inverter and the on-off pattern (voltage vector) which turns on and off the switching devices of the second set of inverter become the effective vector at the same time and become the zero vector at the same time. And, the effective value of the bus line AC component superimposed on bus current is reduced.

In patent document 2, the rotary machine is provided with the two-sets of three-phase armature windings; and by setting the command value which superimposes current of the fifth and seventh harmonic wave components which are mutually reverse phases on the two sets of three-phase armature windings, while suppressing the torque ripple of the motor, the instantaneous value of armature winding current is reduced, and the heat generation of the motor is reduced.

In patent document 3, the rotary machine is provided with one set of three-phase armature windings. And, in the carrier wave comparison PWM of three-phase, the carrier wave compared with the voltage command values of two phases and the carrier wave compared with the voltage command value of one phase are mutually reverse phases. Accordingly, the effective value of the bus line AC component is reduced.

CITATION LIST

Patent Literature

Patent document 1: JP 4941686 B
Patent document 2: WO 2017/141593 A
Patent document 3: JP 2020-137233 A

SUMMARY OF INVENTION

Technical Problem

However, in the technology of patent document 1, since the three-phase voltage command values of each set are shifted to the high potential side or the low potential side from the center value, a deviation of the heat generation occurs in the high potential side or the low potential side switching device in the inverter of each set. The timing of charge and discharge is shifted so that the inverter of the other set is discharged from the DC power source when the DC power source is charged from the inverter of one set. Accordingly, it is necessary to synchronize the PWM control of two sets.

In the technology of patent document 2, by superimposing the harmonic wave components of mutually reverse phases on the armature winding current of each set, although the instantaneous value of armature winding current is reduced, it is difficult to reduce the effective value of the bus line AC component.

The technology of patent document 3 is the technology when one set of three-phase armature windings is provided, but does not disclose the case where two sets of three-phase armature windings are provided.

Then, the purpose of the present disclosure is to provide a controller for rotary machine which can reduce the effective value of the bus line AC component, by utilizing the degree of freedom that two set of armature windings and two sets of inverters are provided, without necessity to synchronize the on/off control timing of the switching devices of first set, and the on/off control timing of the switching devices of second set.

Solution to Problem

A controller for rotary machine according to the present disclosure is a controller for rotary machine which controls a rotary machine which has two sets of plural-phase armature windings, via two sets of inverters connected to the same DC power source, the controller for rotary machine including:

a distribution unit that calculates an utilization factor setting command related to setting of a first set of voltage utilization factor which is a ratio of an amplitude of a fundamental wave component of line voltages of applied voltages of first set of plural-phase armature windings with respect to a power source voltage of the DC power source, and a second set of voltage utilization factor which is a ratio of an amplitude of a fundamental wave component of line voltages of applied voltages of second set of plural-phase armature windings with respect to the power source voltage;

a first set voltage command calculation unit that calculates first set of plural-phase voltage command values, based on the utilization factor setting command;

a second set voltage command calculation unit that calculates second set of plural-phase voltage command values, based on the utilization factor setting command; and a first set switching control unit that turns on and off a plurality of switching devices provided in the first set of inverter, based on the first set of plural-phase voltage command values, and applies voltages to the first set of plural-phase armature windings;

a second set switching control unit that turns on and off a plurality of switching devices provided in the second set of inverter, based on the second set of plural-phase voltage command values, and applies voltages to the second set of plural-phase armature windings, wherein the distribution unit calculates the utilization factor setting command which makes an utilization factor ratio between the first set of voltage utilization factor and the second set of voltage utilization factor change from 1 to 1 so that an effective value of a bus line AC component which is an AC component superimposed on a bus current which flows through a bus line connecting between the DC power source and the two set of inverters becomes lower than a case where the utilization factor ratio is 1 to 1.

Advantage of Invention

In each set, when the voltage utilization factor is changed, on-off pattern of the plurality of switching devices of the inverter and frequency of each pattern are changed, and the effective value of the bus line AC component generated by turning on and off the switching devices increase or decreases. According to the above configuration, by utilizing the degree of freedom that two set of armature windings and two set of inverters are provided, and changing the first set of voltage utilization factor and the second set of voltage utilization factor from 1 to 1, the bus line AC component generated from the first set of inverter and the bus line AC component generated from the second set of inverter are changed from the case of 1 to 1, and the effective value of total bus line AC component of first set and second set can be reduced. Accordingly, an adverse influence of the bus line AC component on the DC power source, and the smoothing capacitor and other apparatuses which are connected to the DC power source can be reduced. Even if the on/off control timing of the switching devices of first set and the on/off control timing of the switching devices of second set are not synchronized, the effective value of the bus line AC component can be decreased, and simplification of the controller and processing can be achieved.

BRIEF DESCRIPTION OF THE DRAWINGS

FIG. 8 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to Embodiment 2;

FIG. 9 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to another example of Embodiment 2;

FIG. 19 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to another example of Embodiment 6;

FIG. 20 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to another example of Embodiment 6; and FIG. 21 is a schematic configuration diagram of the electric power steering apparatus according to other embodiments.

DETAILED DESCRIPTION OF THE EMBODIMENTS

1. Embodiment 1

Figure 1:
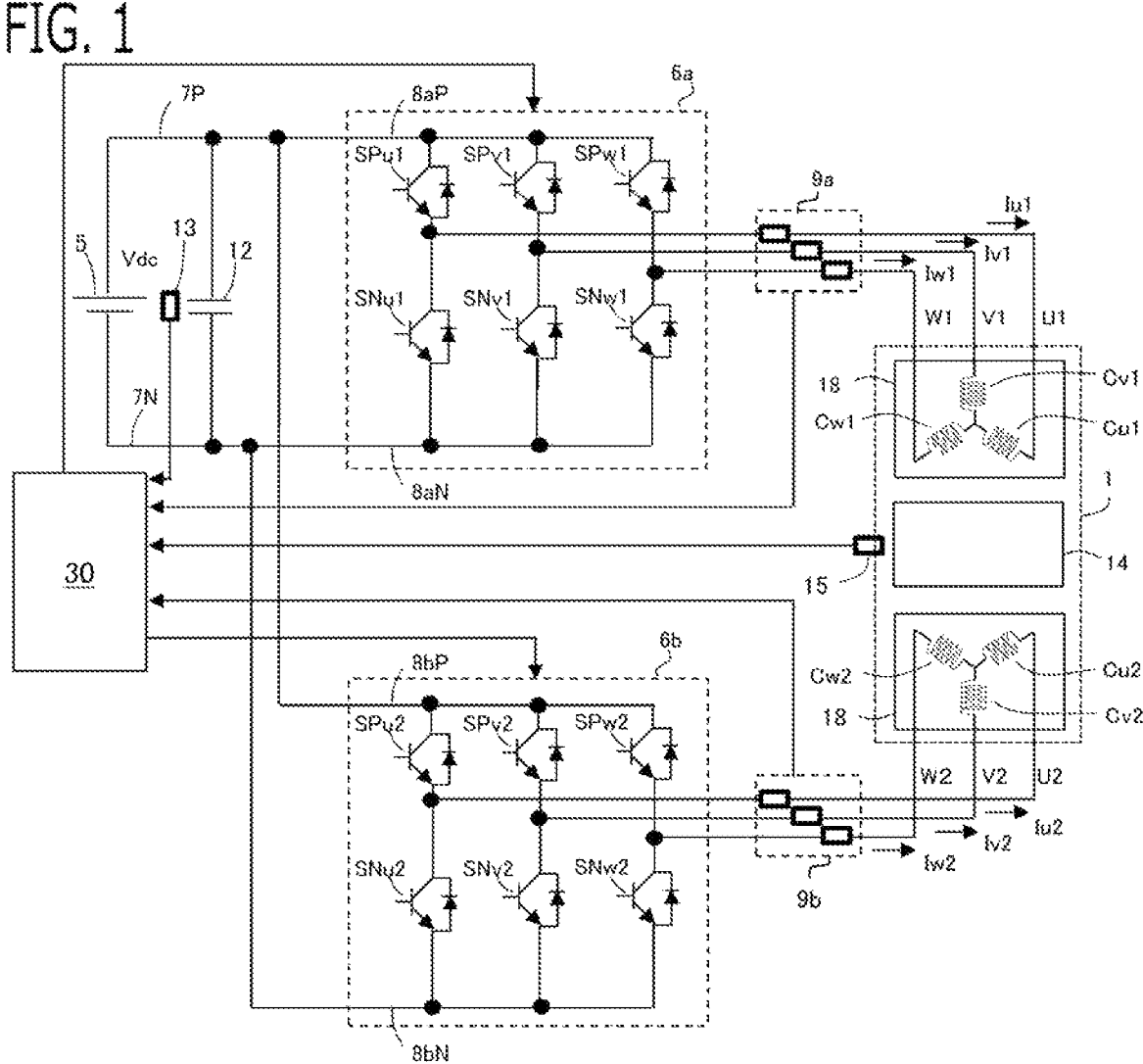
FIG. 1 is a schematic configuration diagram of the controller for rotary machine and a rotary machine according to Embodiment 1.
Figure 2:
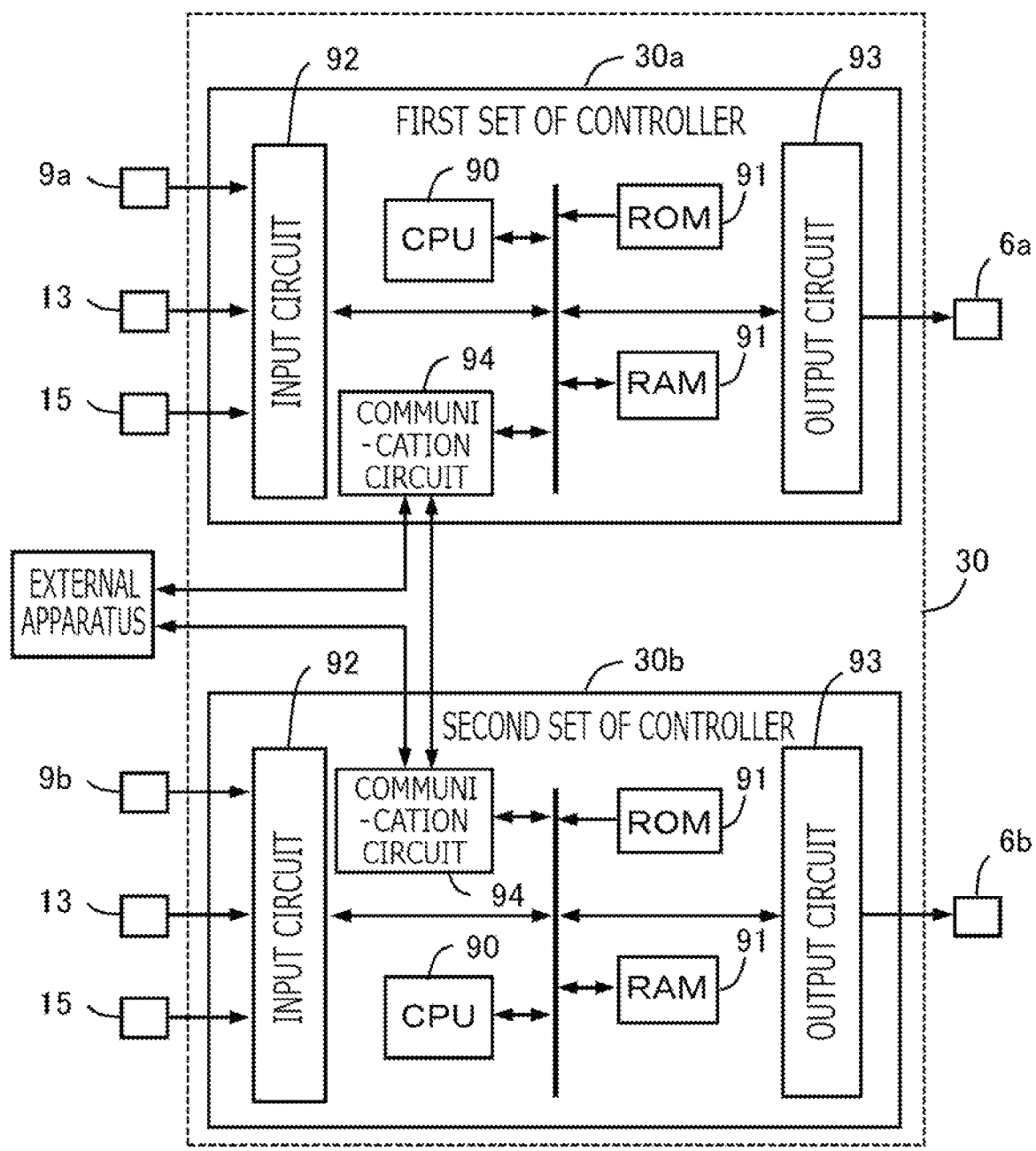
FIG. 2 is a hardware configuration diagram of the controller according to Embodiment 1.

A controller 30 for rotary machine according to Embodiment 1 will be explained with reference to drawings. FIG. 1 is a schematic configuration diagram of a rotary machine 1 and the controller 30 for rotary machine (hereinafter, referred to simply as the controller 30) according to the present embodiment. The rotary machine 1 has two sets of plural-phase armature windings (in this example, three-phase). The controller 30 controls the rotary machine 1 via two sets of inverters 6a, 6b connected to the same DC power source 5. As shown in FIG. 2, the controller 30 is provided with a first set of controller 30a which controls the first set of three-phase armature windings, and a second set of controller 30b which controls the second set of three-phase armature windings.

1-1. Rotary Machine 1

The rotary machine 1 is provided with a cylindrical tubular stator 18 and a rotor 14 disposed on the radial-direction inner side of the stator 18. The two set of three-phase armature windings are wound around the stator 18.

That is, the stator 18 is provided with the first set of three-phase armature windings Cu1, Cv1, Cw1, and the second set of three-phase armature windings Cu2, Cv2, Cw2. The three-phase armature windings of each set may be connected by star connection, or may be connected by Δ connection. The three-phase of first set is defined as U1 phase, V1 phase, and W1 phase. The three-phase of second set is defined as U2 phase, V2 phase, and W2 phase.

Figure 3:
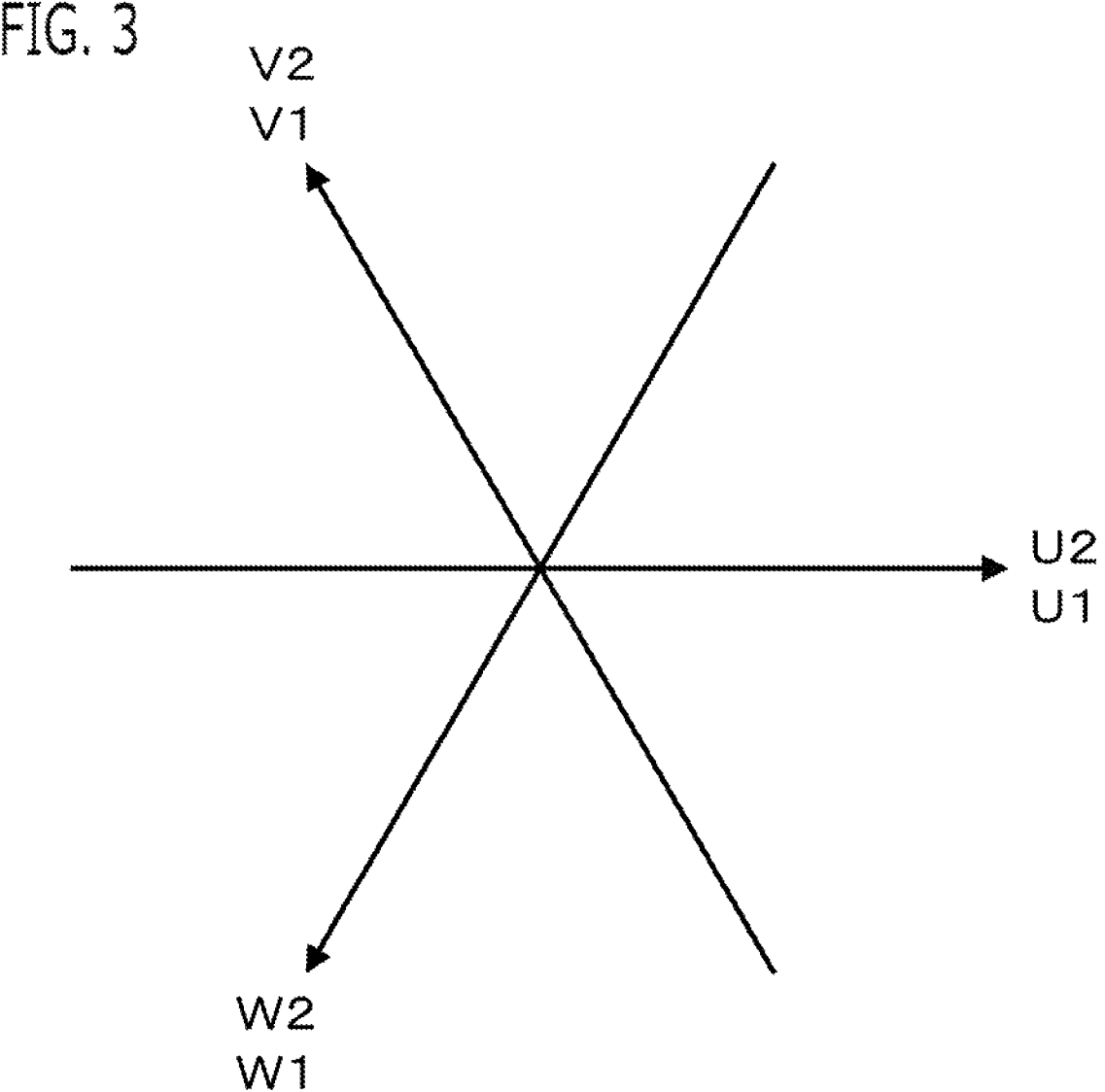
FIG. 3 is a figure explaining the phase of the armature winding of each set according to Embodiment 1.

In the present embodiment, as FIG. 3 shows a schematic diagram, a phase difference in an electrical angle of the position of the second set of three-phase armature windings Cu2, Cv2, Cw2 with respect to the position of the first set of three-phase armature windings Cu1, Cv1, Cw1 is set to 0 degree. The electrical angle becomes an angle obtained by multiplying the number of pole pairs of the magnet to the mechanical angle of the rotor 14. The phase difference may be set to other than 0 degree (for example, $\pi/6$ (30 degrees)).

The rotor 14 is provided with a permanent magnet, and the rotary machine 1 is a permanent magnet type synchronous rotary machine. The rotary machine 1 is a surface magnet type synchronous rotary machine in which the permanent magnet is provided on the peripheral face of the rotor, and is a non-salient pole machine in which d-axis inductance Ld and q-axis inductance Lq are equal. The rotary machine 1 may be an embedded magnet type synchronous rotary machine in which the permanent magnet is provided inside the rotor 14, and may be a salient pole machine in which the q-axis inductance Lq is larger than the d-axis inductance Ld.

The rotor 14 is provided with a rotation sensor 15 for detecting a rotational angle of the rotor 14. The rotation sensor 15 is a redundant type, and outputs a first output signal related to the first rotational angle 91 for control of the first set of three-phase armature windings, and a second output signal related to the second rotational angle 92 for control of the second set of three-phase armature windings. The first output signal related to the first rotational angle $\theta1$ is inputted into the first set of controller 30a. The second output signal related to the second rotational angle $\theta2$ is inputted into the second set of controller 30b. Various kinds of sensors, such as a Hall element, resolver, or an encoder, are used for the rotation sensor 15. The rotation sensor 15 may be not provided, and the rotational angle of each set (the magnetic pole position of each set) may be estimated based on current information of each set which are obtained by superimposing a harmonic wave component on the current command value of each set describes below (so-called, sensorless system).

1-2. DC Power Source 5

The DC power source 5 outputs a DC voltage Vdc to the first set of inverter 6a and the second set of inverter 6b. As the DC power source 5, any apparatus which outputs power source voltage, such as a battery, a DC-DC converter, a diode rectifier, and a PWM rectifier, is used.

The DC power source 5 and the two sets of inverters 6a, 6b are connected via a common bus line 7. The bus line 7 is provided with a high potential side bus line 7P, and a low potential side bus line 7N. One end of the high potential side bus line 7P is connected to a high potential side of the DC power source 5. One end of the low potential side bus line 7N is connected to a low potential side of the DC power source 5. The other end of the high potential side bus line 7P is branched and connected to a high potential side electric line 8aP of the first set of inverter 6a, and a high potential side electric line 8bP of the second set of inverter 6b. The other end of the low potential side bus line 7N is branched and connected to a low potential side electric line 8aN of the first set of inverter 6a, and a low potential side electric line 8bN of the second set of inverter 6b.

A smoothing capacitor 12 is connected between the high potential side bus line 7P and the low potential side bus line 7N. The smoothing capacitor 12 suppresses and stabilizes variation of the DC voltage Vdc supplied to the first set of inverter 6a and the second set of inverter 6b.

A power source voltage sensor 13 which detects the DC voltage Vdc supplied to the inverters 6a, 6b of each set from the DC power source 5 is provided. The power source voltage sensor 13 is connected between the high potential side bus line 7P and the low potential side bus line 7N. An output signal of the power source voltage sensor 13 is inputted into the first set of controller 30a and the second set of controller 30b. A first set of DC voltage Vdc1 inputted into the first set of inverter 6a, and a second set of DC voltage Vdc2 inputted into the second set of inverter 6b may be individually detected by a first set of power source voltage sensor and a second set of power source voltage sensor, and may be individually inputted into the first set of controller 30a and the second set of controller 30b.

1-3. Inverter

The first set of inverter 6a performs power conversion between the DC power source 5 and the first set of three-phase armature windings. The second set of inverter 6b performs power conversion between the DC power source 5 and the second set of three-phase armature windings.

The first set of inverter 6a is provided with three series circuits in each of which a high potential side switching device SP connected to the high potential side of the DC power source 5 and a low high potential side switching device SN connected to the low high potential side of the DC power source 5 are connected in series, corresponding to respective phase of the first set of three-phase armature windings. A connection node of two switching devices in each series circuit is connected to the first set of the armature winding of the corresponding phase. The second set of inverter 6b is provided with three series circuits in each of which a high potential side switching device SP connected to the high potential side of the DC power source 5 and a low high potential side switching device SN connected to the low high potential side of the DC power source 5 are connected in series, corresponding to respective phase of the second set of three-phase armature windings. A connection node of two switching devices in each series circuit is connected to the second set of the armature winding of the corresponding phase.

Specifically, in the series circuit of each phase of the first set of inverter 6a, the collector terminal of the high potential side switching device SP is connected to the high potential side electric line 8aP, the emitter terminal of the high potential side switching device SP is connected to the collector terminal of the low potential side switching device SN, and the emitter terminal of the low potential side switching device SN is connected to the negative electrode side electric line 8aN. The connection node between the high potential side switching device SP and the low potential side switching device SN is connected to the first set of armature winding of corresponding phase.

Specifically, in the series circuit of each phase of the second set of inverter 6b, the collector terminal of the high potential side switching device SP is connected to the high potential side electric line 8bP, the emitter terminal of the high potential side switching device SP is connected to the collector terminal of the low potential side switching device SN, and the emitter terminal of the low potential side switching device SN is connected to the negative electrode side electric line 8bN. The connection node between the high potential side switching device SP and the low potential side switching device SN is connected to the second set of armature winding of corresponding phase.

IGBT (Insulated Gate Bipolar Transistor) in which a diode is connected in inverse parallel, a bipolar transistor in which a diode is connected in inverse parallel, MOSFET (Metal Oxide Semiconductor Field Effect Transistor) which has a function of diode connected in inverse parallel, or the like is used for the switching device of the inverter of each set.

A gate terminal of each switching device of the first set of inverter 6a is connected to the first set of controller 30a via a gate driving circuit and the like. Accordingly, each switching device of first set is turned on or turned off by a switching signal outputted from the first set of controller 30a. A gate terminal of each switching device of the second set of inverter 6b is connected to the second set of controller 30b via a gate driving circuit and the like. Accordingly, each switching device of second set is turned on or turned off by a switching signal outputted from the second set of controller 30b.

A first set current sensor 9a for detecting currents which flows into the first set of three-phase armature windings and a second set current sensor 9b for detecting currents which flows into the second set of three-phase armature windings are provided. The current sensor of each set 9a, 9b is a current sensor, such as a Hall element, or a shunt resistance. An output signal of the first set current sensor 9a is inputted into the first set of controller 30a. An output signal of the second set current sensor 9b is inputted into the second set of controller 30b.

In the present embodiment, the first set current sensor 9a is provided on a wire which connects between the series circuit of the switching devices of each phase of the first set of inverter 6a, and the armature winding of each phase. The second set current sensor 9b is provided on a wire which connects between the series circuit of the switching devices of each phase of the second set of inverter 6b, and the armature winding of each phase. The current sensor of each set 9a, 9b may be provided in the series circuit of each phase of the inverter of each set. Alternatively, the current sensor of each set 9a, 9b may be provided on a wire which connects between the inverter of each set 6a, 6b and the DC power source 5, and the current of each of the winding of each phase may be detected by well-known "bus line one-shunt system" about each set.

1-4. Controller 30

Figure 4:
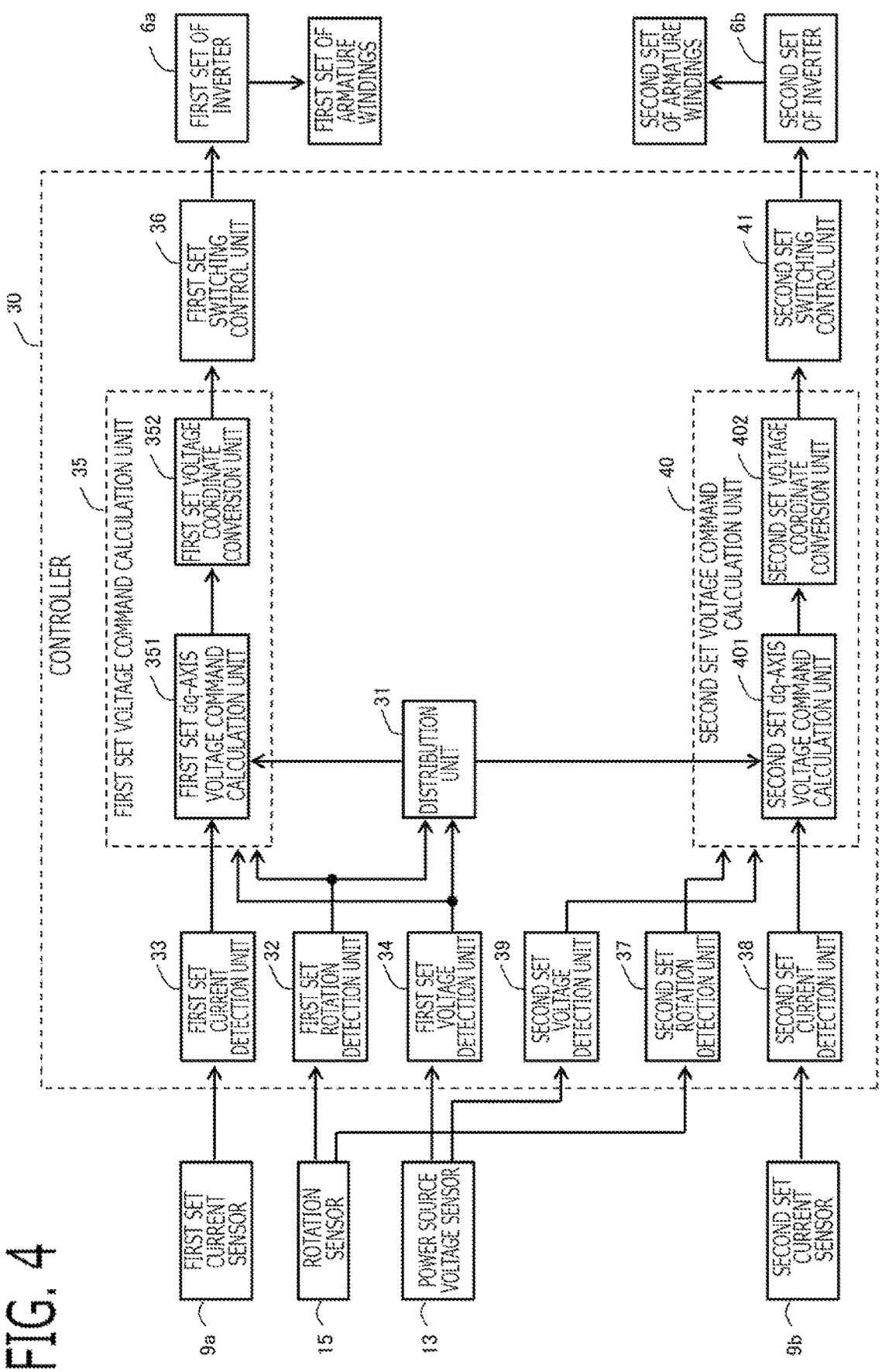
FIG. 4 is a schematic block diagram of the controller according to Embodiment 1.

The controller 30 controls the rotary machine 1 via the two sets of inverters 6a, 6b. As shown in FIG. 4, the controller 30 is provided with functional units such as a distribution unit 31, a first set rotation detection unit 32, a first set current detection unit 33, a first set voltage detection unit 34, a first set voltage command calculation unit 35, a first set switching control unit 36, a second set rotation detection unit 37, a second set current detection unit 38, a second set voltage detection unit 39, a second set voltage command calculation unit 40, and the second set switching control unit 41. Each function of the controller 30 is realized by processing circuits provided in the controller 30.

In the present embodiment, the controller 30 is provided with the first set of controller 30a and the second set of controller 30b. The first set of controller 30a is provided with the distribution unit 31, the first set rotation detection unit 32, the first set current detection unit 33, the first set voltage detection unit 34, the first set voltage command calculation unit 35, and the first set switching control unit 36. The second set of controller 30b is provided with the second set rotation detection unit 37, the second set current detection unit 38, the second set voltage detection unit 39, the second set voltage command calculation unit 40, and the second set switching control unit 41. The second set of controller 30b may be provided with the distribution unit 31. Alternatively, both controllers may be provided with the distribution unit 31. When operation of both controllers is normal, the distribution unit 31 of preliminarily set one controller may operate. And, when operation of one controller becomes abnormal, the distribution unit 31 of the other controller may operate. Alternatively, a third controller may be provided with the distribution unit 31. The third controller and the first set and the second set of controllers 30a, 30b may be connected by communication.

As shown in FIG. 2, the controller 30a, 30b of each set includes, as processing circuits, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, a communication circuit 94, and the like. The storage apparatuses 91, the input circuit 92, the output circuit 93, and the communication circuit 94 are connected to the arithmetic processor 90 via signal wires such as a bus.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and such as the power source voltage sensors 13, the rotation sensor 15, and the current sensor 9a, 9b of each set, and is provided with A/D converter and the like for inputting output signals from the sensors to the arithmetic processor 90. The output circuit 93 is connected with electric loads such as a gate drive circuit which drive on/off of the switching devices, and is provided with a driving circuit and the like for outputting a control signal from the arithmetic processor 90. The communication circuit 94 of each set communicates by being connected mutually, and communicates with the external apparatus.

Then, the arithmetic processor 90 of the controller 30a, 30b of each set runs software items (programs) stored in the storage apparatus 91 such as ROM and EEPROM, and collaborates with other hardware devices in the controller 30a, 30b of each set, such as the storage apparatus 91, the input circuit 92, the output circuit 93, and the communication circuit 94, so that the respective functions of the control units 31 to 41 included in the controller 30a, 30b of each set are realized. Setting data items such as the threshold value Mth, the target voltage utilization factor MoH, the electric constants, and the map data to be utilized in the control units 31 to 41 are stored, as part of software items (programs), in the storage apparatus 91 such as ROM. Each function of the controller 30 will be described in detail below.

1-4-1. Basic Control of First Set

The first set rotation detection unit 32 detects a first rotational angle θ1 (first magnetic pole position θ1), and a first rotational angle speed ω1 of the rotor in the electrical angle, based on the first output signal of the rotation sensor 15. The first rotational angle θ1 is an angle of N pole of the rotor on the basis of the armature winding position of U1 phase of first set. The first rotation detection unit 32 may estimate the first rotational angle θ1 without using the rotation sensor, based on current information which are obtained by superimposing a harmonic wave component on the first set of current command value (so-called, sensorless system).

The first set voltage detection unit 34 detects a first DC voltage Vdc1, based on the output signal of the power source voltage sensor 13.

The first set current detection unit 33 detects first set of three-phase currents Iu1s, Iv1s, Iw1s which flows through the first set of three-phase armature windings, based on the output signal of the first set current sensor 9a. Then, as shown in the next equation, the first set current detection unit 33 calculates a first set of current detection value of d-axis Id1s and a first set of current detection value of q-axis Iq1s, by performing a three-phase/two-phase conversion and a rotating coordinate conversion to the first set of three-phase currents detection value Iu1s, Iv1s, Iw1s, based on the first rotational angle θ1.

[Equation 1]

$$\begin{bmatrix} I_{d1s} \\ I_{q1s} \end{bmatrix} = \sqrt{\frac{2}{3}} \begin{bmatrix} \cos\theta_1 & \cos\left(\theta_1 - \frac{2\pi}{3}\right) & \cos\left(\theta_1 + \frac{2\pi}{3}\right) \\ -\sin\theta_1 & -\sin\left(\theta_1 - \frac{2\pi}{3}\right) & -\sin\left(\theta_1 + \frac{2\pi}{3}\right) \end{bmatrix} \begin{bmatrix} I_{u1s} \\ I_{v1s} \\ I_{w1s} \end{bmatrix} \quad (1)$$

The coordinate system of the d-axis and the q-axis (hereinafter, referred to as a dq-axis coordinate system) is a two-axis rotating coordinate system which rotates synchronizing with the first rotational position θ1 (the first magnetic pole position θ1) of the rotary machine (rotor). In detail, the dq-axis rotating coordinate system consists of the d-axis defined in the direction of the first magnetic pole position θ1 (N pole of the magnet) of the rotor, and the q-axis defined in a direction advanced to the d-axis by 90 degrees in the electrical angle.

The first set voltage command calculation unit 35 calculates first set of three-phase voltage command values Vu1o, Vv1o, Vw1o, based on the utilization factor setting command (in this example, first set of current command values of dq-axis Id1o, Iq1o) commanded from the distribution unit 31 described below. In the present embodiment, the first set voltage command calculation unit 35 is provided with a first set dq-axis voltage command calculation unit 351 and a first set voltage coordinate conversion unit 352.

The first set dq-axis voltage command calculation unit 351 changes first set of voltage command values of dq-axis Vd1o, Vq1o by PI control and the like so that the first set of current detection values of dq-axis Id1s, 1q1s approach the first set of current command values of dq-axis Id1o, Iq1o, respectively. As shown in the next equation, the first set voltage coordinate conversion unit 352 converts the first set of voltage command values of dq-axis Vd1o, Vq1o into the first set of three-phase voltage command values Vu1o, Vv1o, Vw1o, by performing a fixed coordinate conversion and a two-phase/three-phase conversion, based on the first rotational angle θ1.

[Equation 2]

$$\begin{bmatrix} V_{u1o} \\ V_{v1o} \\ V_{w1o} \end{bmatrix} = \sqrt{\frac{2}{3}} \begin{bmatrix} \cos\theta_1 & -\sin\theta_1 \\ \cos\left(\theta_1 - \frac{2\pi}{3}\right) & -\sin\left(\theta_1 - \frac{2\pi}{3}\right) \\ \cos\left(\theta_1 + \frac{2\pi}{3}\right) & -\sin\left(\theta_1 + \frac{2\pi}{3}\right) \end{bmatrix} \begin{bmatrix} V_{d1o} \\ V_{q1o} \end{bmatrix} \quad (2)$$

Then, in order to improve the voltage utilization factor, the well-known amplitude reduction modulation, such as the third order harmonic wave superimposing, the space vector modulation, and the two-phase modulation, is added to the first set of three-phase voltage command values Vu1o, Vv1o, Vw1o. By the amplitude reduction modulation, while line voltages of the three-phase voltage command values are maintained, an amplitude of the three-phase voltage command values is reduced to √3/2 times (about 0.866 times). Accordingly, the maximum amplitude of the three-phase voltage command values before the amplitude reduction modulation that the final three-phase voltage command values do not exceed the range of DC voltage (−Vdc/2 to +Vdc/2) (voltage saturation is not caused) can be increased to 2/√3 times (about 1.15 times) by the amplitude reduction modulation. A value obtained by multiplying √3 to an amplitude of fundamental wave components of the first set of three-phase voltage command values Vu1o, Vv1o, Vw1o becomes an amplitude of fundamental wave components of the line voltages of the first set of three-phase voltage command values Vu1o, Vv1o, Vw1o. The amplitude reduction modulation may not be performed.

In the present embodiment, the first set dq-axis voltage command calculation unit 351 calculates the first set of voltage command values of dq-axis and the first set of three-phase voltage command values that the final first set of three-phase voltage command values do not exceed the range of DC voltage (−Vdc/2 to +Vdc/2), and do not become in an overmodulation state and a voltage saturation state. For example, the first set of voltage command values of dq-axis are limited so that the voltage utilization factor of the first set of voltage command values of dq-axis becomes less than or equal to the maximum voltage utilization factor in a range of the voltage utilization factor to be set (100% in the case where the amplitude reduction modulation is performed, or 86.6% in the case where the amplitude reduction modulation is not performed).

The first set switching control unit 36 turn on and off the plurality of switching devices provided in the first set of inverter 6a, based on the first set of three-phase voltage command values Vu1o, Vv1o, Vw1o, and apply voltages to the first set of three-phase armature windings. The first set switching control unit 36 uses well-known the carrier wave comparison PWM or the space vector PWM.

Figure 5:
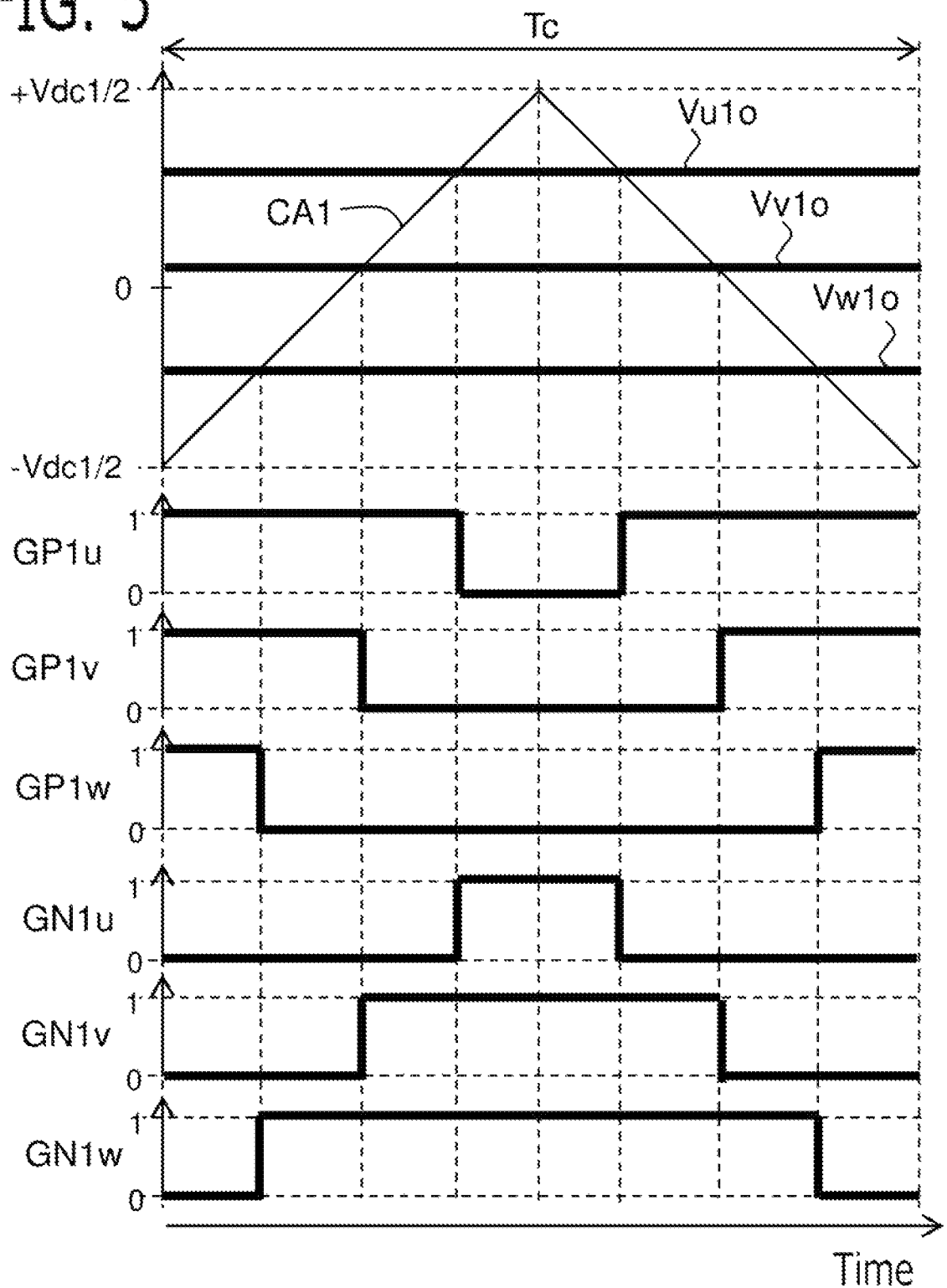
FIG. 5 is a time chart explaining the carrier wave comparison PWM control according to Embodiment 1.

In the case where the carrier wave comparison PWM is used, the first set switching control unit 36 compare each of the first set of three-phase voltage command values Vu1o, Vv1o, Vw1o with a first set of carrier wave CA1, and turns on and off the plurality of switching devices based on the comparison result. In the present embodiment, as shown in FIG. 5, the first set of carrier wave CA1 which is compared with each of the first set of three-phase voltage command values Vu1o, Vv1o, Vw1o is the same carrier wave. The first set of carrier wave CA1 is a triangular wave which vibrates with an amplitude of half value of DC voltage Vdc1/2 centering on 0, at the PWM period Tc. Any waveforms, such as a saw tooth wave, may be used other than the triangular wave.

About each phase, the first set switching control unit 36 turn on the switching signal GP1 of the high potential side switching device (in this example, 1) and turn on the high potential side switching device when the first set of carrier wave CA1 is less than voltage command value; and turns off the switching signal GP1 of the high potential side switching device (in this example, 0) and turns off the high potential side switching device when the first set of carrier wave CA1 exceeds the voltage command value. On the other hand, about each phase, the first set switching control unit 36 turn off the switching signal GN1 of the low potential side switching device (in this example, 0) and turn off the low potential side switching device when the first set of carrier wave CA1 is less than the voltage command value; and turns on the switching signal GN1 of the low potential side switching device (in this example, 1) and turns on the low potential side switching device when the first set of carrier wave CA1 exceeds the voltage command value. About each phase, between the on period of the high potential side switching device and the on period of the low potential side switching device, a short circuit prevention period (dead time) when both of the high potential side and the low potential side switching device are turned off may be provided.

In the case where the space vector PWM is used, the first set switching control unit 36 generates a first set of voltage command vector from the first set of three-phase voltage command values Vu1o, Vv1o, Vw1o; determines an output time allocation of seven basic voltage vectors in the PWM period, based on the first set of voltage command vector; and generates the switching signal which turns on and off each switching device in the PWM period, based on the setting time allocation of seven basic voltage vectors.

1-4-2. Basic Control of Second Set

The second set rotation detection unit 37 detects a second rotational angle θ2 (second magnetic pole position θ2), and a second rotational angle speed ω2 of the rotor in the electrical angle, based on the second output signal of the rotation sensor 15. The second rotational angle θ2 is an angle of N pole of the rotor on the basis of the armature winding position of U2 phase of second set. The second rotation detection unit 37 may estimate the second rotational angle θ2 without using the rotation sensor, based on current information which are obtained by superimposing a harmonic wave component on the second set of current command value (so-called, sensorless system).

The second set voltage detection unit 39 detects a second DC voltage Vdc2, based on the output signal of the power source voltage sensor 13.

The second set current detection unit 38 detects second set of three-phase currents Iu2s, Iv2s, Iw2s which flow through the second set of three-phase armature windings, based on the output signal of the second set current sensor 9b. Then, similarly to the equation (1), the second set current detection unit 38 calculates a second set of current detection value of d-axis Id2s and a second set of current detection value of q-axis Iq2s, by performing a three-phase/two-phase conversion and a rotating coordinate conversion to the second set of three-phase currents detection value Iu2s, Iv2s, Iw2s, based on the second rotational angle θ2.

The coordinate system of the d-axis and the q-axis (hereinafter, referred to as a dq-axis coordinate system) is a two-axis rotating coordinate system which rotates synchronizing with the second rotational position θ2 (the second magnetic pole position θ2) of the rotary machine (rotor). In detail, the dq-axis rotating coordinate system consists of the d-axis defined in the direction of the second magnetic pole position θ2 (N pole of the magnet) of the rotor, and the q-axis defined in a direction advanced to the d-axis by 90 degrees in the electrical angle.

The second set voltage command calculation unit 40 calculates second set of three-phase voltage command values Vu2o, Vv2o, Vw2o, based on the utilization factor setting command (in this example, second set of current command values of dq-axis Id2o, Iq2o) commanded from the distribution unit 31 described below. In the present embodiment, the second set voltage command calculation unit 40 is provided with a second set dq-axis voltage command calculation unit 401 and a second set voltage coordinate conversion unit 402.

The second set dq-axis voltage command calculation unit 401 changes second set of voltage command values of dq-axis Vd2o, Vq2o by PI control and the like so that the second set of current detection values of dq-axis Id2s, Iq2s approach the second set of current command values of dq-axis Id2o, Ig2o, respectively. Similarly to the equation (2), the second set voltage coordinate conversion unit 402 converts the second set of voltage command values of dq-axis Vd2o, Vq2o into the second set of three-phase voltage command values Vu2o, Vv2o, Vw2o, by performing a fixed coordinate conversion and a two-phase/three-phase conversion, based on the second rotational angle θ2.

Then, similarly to the first set, in order to improve the voltage utilization factor, the well-known amplitude reduction modulation, such as the third order harmonic wave superimposing, the space vector modulation, and the two-phase modulation, is added to the second set of three-phase voltage command values Vu2o, Vv2o, Vw2o. The second set dq-axis voltage command calculation unit 401 calculates the second set of voltage command values of dq-axis and the second set of three-phase voltage command values that the final second set of three-phase voltage command values do not exceed the range of DC voltage (−Vdc/2 to +Vdc/2), and do not become in the overmodulation state and the voltage saturation state. For example, the second set of voltage command values of dq-axis are limited so that the voltage utilization factor of the second set of voltage command values of dq-axis becomes less than or equal to the maximum voltage utilization factor in a range of the voltage utilization factor to be set (100% in the case where the amplitude reduction modulation is performed, or 86.6% in the case where the amplitude reduction modulation is not performed).

The second set switching control unit 41 turn on and off the plurality of switching devices provided in the second set of inverter 6b, based on the second set of three-phase voltage command values Vu2o, Vv2o, Vw2o, and apply voltages to the second set of three-phase armature windings. The second set switching control unit 41 uses well-known the carrier wave comparison PWM or the space vector PWM.

In the case where the carrier wave comparison PWM wave is used, the second set switching control unit 41 compare each of the second set of three-phase voltage command values Vu2o, Vv2o, Vw2o with a second set of carrier wave CA2, and turns on and off the plurality of switching devices based on the comparison result. In the present embodiment, similarly to FIG. 5 of the first set, the second set of carrier wave CA2 which is compared with each of the second set of three-phase voltage command values Vu2o, Vv2o, Vw2o is the same carrier wave. The second set of carrier wave CA2 is a triangular wave which vibrates with an amplitude of half value of DC voltage Vdc2/2 centering on 0, at the PWM period Tc. Since processing of the second set switching control unit 41 is similarly to processing of the first set switching control unit 36, explanation is omitted.

1-4-3. Distribution Unit 31

<Utilization Factor Setting Command Related to Setting of Voltage Utilization Factor of Each Set>

The distribution unit 31 calculates a utilization factor setting command related to setting of a first set of voltage utilization factor M1 and a second set of voltage utilization factor M1. As shown in the next equation, the first set of voltage utilization factor M1 is a ratio of an amplitude V1amp of fundamental wave components of line voltages of applied voltages of the first set of three-phase armature windings with respect to the power source voltage Vdc of the DC power source. The second set of voltage utilization factor M2 is a ratio of an amplitude V2amp of fundamental wave components of line voltages of applied voltages of the second set of three-phase armature windings with respect to the power source voltage Vdc of the DC power source.

[Equation 3]

$$M_1 = \frac{V_{1amp}}{V_{dc}}, M_2 = \frac{V_{2amp}}{V_{dc}} \tag{3}$$

And, as shown in the next equation, a square root of a square sum of the first set of voltage command values of dq-axis Vd1o, Vq1o (a magnitude |Vdq1| of first set of voltage vector of dq-axis Vdq1) becomes equal to a value obtained by dividing the amplitude V1amp of fundamental wave components of line voltages of applied voltages of the first set of three-phase armature windings by √2. And, the first set of voltage utilization factor M1 can be calculated by the square root of the square sum. A square root of a square sum of the second set of voltage command values of dq-axis Vd2o, Vg2o (a magnitude |Vdq2| of second set of voltage vector of dq-axis Vdq2) becomes equal to a value obtained by dividing the amplitude V2amp of fundamental wave components of line voltages of applied voltages of the second set of three-phase armature windings by √2. And, the second set of voltage utilization factor M2 can be calculated by the square root of the square sum.

[Equation 4]

$$|V_{dq1}| = \sqrt{V_{d1o}^2 + V_{q1o}^2} = \frac{V_{1amp}}{\sqrt{2}}, M_1 = \frac{\sqrt{2}\sqrt{V_{d1o}^2 + V_{q1o}^2}}{V_{dc}}$$

$$|V_{dq2}| = \sqrt{V_{d2o}^2 + V_{q2o}^2} = \frac{V_{2amp}}{\sqrt{2}}, M_2 = \frac{\sqrt{2}\sqrt{V_{d2o}^2 + V_{q2o}^2}}{V_{dc}} \tag{4}$$

About each set, the line voltage of the applied voltage (or voltage command value) of the armature winding of U phase becomes a voltage obtained by subtracting the applied voltage (or voltage command value) of the armature winding of V phase from the applied voltage (or voltage command value) of the armature winding of U phase. The line voltage of the applied voltage (or voltage command value) of the armature winding of V phase becomes a voltage obtained by subtracting the applied voltage (or voltage command value) of the armature winding of W phase from the applied voltage (or voltage command value) of the armature winding of V phase. The line voltage of the applied voltage (or voltage command value) of the armature winding of W phase becomes a voltage obtained by subtracting the applied voltage (or voltage command value) of the armature winding of U phase from the applied voltage (or voltage command value) of the armature winding of W phase.

<Change of Utilization Factor Ratio R12>

Then, the distribution unit 31 calculates the utilization factor setting command which makes the utilization factor ratio R12 change from 1 to 1 so that an effective value of a bus line AC component which is an AC component superimposed on the bus current which flows through the bus line 7 connecting between the DC power source Vdc and the two sets of inverters 6a, 6b becomes lower than a case where the utilization factor ratio R12 between the first set of voltage utilization factor M1 and the second set of voltage utilization factor M2 is 1 to 1.

In each set, when the voltage utilization factor is changed, on-off pattern of the plurality of switching devices of the inverter and frequency of each pattern are changed, and the effective value of the bus line AC component generated by turning on and off the switching devices increase or decreases. According to the above configuration, by utilizing the degree of freedom that two set of armature windings and two set of inverters are provided, and changing the first set of voltage utilization factor M1 and the second set of voltage utilization factor M2 from 1 to 1, the bus line AC component generated from the first set of inverter and the bus line AC component generated from the second set of inverter are changed from the case of 1 to 1, the effective value of total bus line AC component of the first set and the second set can be reduced. Accordingly, an adverse influence of the bus line AC component on the DC power source, and the smoothing capacitor 12 and other apparatuses which are connected to the DC power source can be reduced. For example, if the effective value of the bus line AC component is large, the capacity of the smoothing capacitor 12 is required to be enlarged, the heat generation of the smoothing capacitor 12 may become large, and the lifetime of the smoothing capacitor 12 may become short.

When changing the utilization factor ratio R12 from 1 to 1, the distribution unit 31 calculates the utilization factor setting command which makes the utilization factor ratio R12 change from 1 to 1 so that the effective value of the bus line AC component becomes the minimum. According to this configuration, the reduction effect of the effective value of the bus line AC component can be maximized.

The utilization factor setting command which makes the effective value of the bus line AC component becomes the minimum is not necessary to be calculated. Considering other factors, for example, suppression of heat generation of the armature winding and the inverter of set in which the voltage utilization factor is made high, and easiness of control, the utilization factor setting command which can reduce the effective value of the bus line AC component less than the case where the utilization factor ratio R12 is 1 to 1 may be calculated.

<Total Torque>

When changing the utilization factor ratio R12 from 1 to 1, the distribution unit 31 calculates the utilization factor setting command so that a total torque of a first set of torque by the magnetic flux of the first set of three-phase armature windings and a second set of torque by the magnetic flux of the second set of three-phase armature windings coincides with a total torque command value. According to this configuration, even when changing the utilization factor ratio R12 from 1 to 1, the total torque can be coincided with the total torque command value.

<Determination by Average Voltage Utilization Factor>

When an average voltage utilization factor of the first set of voltage utilization factor and the second set of voltage utilization factor is greater than or equal to a threshold value Mth, the distribution unit 31 calculates the utilization factor setting command which makes the utilization factor ratio R12 change from 1 to 1. When the average voltage utilization factor is less than the threshold value Mth, the distribution unit 31 calculates the utilization factor setting command which makes the utilization factor ratio R12 becomes 1 to 1.

Even when the utilization factor ratio R12 is changed from 1 to 1, one set of voltage utilization factor cannot be changed so as to become larger than 100% of the maximum voltage utilization factor, and the other set of voltage utilization factor cannot be changed so as to become smaller than 0%. Accordingly, when the average voltage utilization factor is low, a change amount by which the utilization factor ratio R12 can be changed from 1 to 1 becomes small, and the effective value of the bus line AC component cannot sufficiently be reduced. When the average voltage utilization factor is small, since the effective value of the bus line AC component becomes small, the necessity of changing the utilization factor ratio R12 from 1 to 1 is low. According to the above configuration, when the average voltage utilization factor is greater than or equal to the threshold value Mth, since the utilization factor ratio R12 is changed from 1 to 1, the effective value of the bus line AC component can be reduced effectively.

<Calculation of Current Command Value of Each Set>

In the present embodiment, the distribution unit 31 calculates, as the utilization factor setting command, first set of current command value about the first set of three-phase armature windings (in this example, the first set of current command values of dq-axis Id1$o$, Iq1$o$), and second set of current command value about the second set of three-phase armature windings (in this example, the second set of current command values of dq-axis Id2$o$, Iq2$o$). Then, when changing the utilization factor ratio R12 from 1 to 1, the distribution unit 31 calculates the first set of current command value and the second set of current command value so that the utilization factor ratio R12 is changed from 1 to 1.

According to this configuration, since the current command value of each set is calculated as the utilization factor setting command, and is commanded to each set, the voltage utilization factor M1, M2 of each set is changed with good accuracy, and the utilization factor ratio R12 can be controlled with good accuracy.

When changing the utilization factor ratio R12 from 1 to 1, the distribution unit 31 sets one set of the target voltage utilization factor MoH so that one set of the voltage utilization factor among the first set of voltage utilization factor M1 and the second set of voltage utilization factor M2 becomes higher than the other set of voltage utilization factor. Then, the distribution unit 31 calculates one set of current command value, based on one set of target voltage utilization factor MoH and the rotational angle speed $\omega$ (in this example, $\omega$1) of the rotor, so that a voltage utilization factor of the applied voltages of one set coincides with one set of target voltage utilization factor MoH. And, the distribution unit 31 calculates the other set of current command value, based on one set of current command value, so that the total torque of the first set of torque by the magnetic flux of the first set of three-phase armature windings and the second set of torque by the magnetic flux of the second set of three-phase armature windings coincides with the total torque command value.

In one set in which the voltage utilization factor is made high, when the voltage utilization factor exceeds 100%, the three-phase voltage command values exceed the range (−Vdc/2 to +Vdc/2) of the DC voltage Vdc (in this example, Vdc1), it becomes in the overmodulation state and the voltage saturation state, harmonic wave components are superimposed on the line voltages and the winding currents, and harmonic wave components are superimposed on torque. On the other hand, in the other set in which the voltage utilization factor is made low, there is no this kind anxiety. According to the above configuration, since one set of current command value is calculated so that the voltage utilization factor of the applied voltages of one set in which the voltage utilization factor is made high coincides with one set of target voltage utilization factor MoH, one set of voltage utilization factor can be changed to the target voltage utilization factor MoH with good accuracy. Accordingly, it can be prevented that the voltage utilization factor is made high too much, it becomes in the overmodulation state and the voltage saturation state, and the harmonic wave component is superimposed on torque. On the other hand, in the other set in which the voltage utilization factor is made low, since the other set of current command value is calculated based on one set of current command value so that the total torque coincides with the total torque command value, the total torque can be coincided with the total torque command value. Therefore, even when changing the utilization factor ratio R12 from 1 to 1, one set of voltage utilization factor can be made high accurately, it can be prevented from becoming in the overmodulation state and the voltage saturation state, and the total torque can be coincided with the target with good accuracy.

As described later using the flowchart of FIG. 6, in the present embodiment, one set in which the voltage utilization factor is made high is the first set, and the other set in which the voltage utilization factor is made low is the second set. The first set and the second set may be replaced. Alternatively, one set may be periodically replaced between the first set and the second set so that heat generation does not become unbalance.

<Setting of Target Voltage Utilization Factor MoH by Average Voltage Utilization Factor>

The distribution unit 31 sets a reference value of first set of current command value and a reference value of second set of current command value which are set when assuming that the utilization factor ratio R12 is set to 1 to 1. The distribution unit 31 calculates an average voltage utilization factor Mave0 of the first set of voltage utilization factor and the second set of voltage utilization factor (hereinafter, referred to as an average voltage utilization factor in reference state Mave0) corresponding to the reference value of first set of current command value, and the reference value of second set of current command value. Then, when changing the utilization factor ratio R12 from 1 to 1, the distribution unit 31 sets one set of target voltage utilization factor MoH, based on the average voltage utilization factor in reference state Mave0.

Regardless of presence or absence of change of the utilization factor ratio R12 from 1 to 1, the average voltage utilization factor becomes equivalent. When not changing the utilization factor ratio R12 from 1 to 1, since it is the reference state, the target voltage utilization factor MoH can be set with good accuracy, based on the average voltage utilization factor in reference state Mave0.

1-4-3-1. Detailed Processing of Distribution Unit 31

With reference to the flowchart of FIG. 6, detailed processing of the distribution unit 31 will be explained.

<Step S01>

In the step S01, the distribution unit 31 sets reference values of first set of current command values of dq-axis Id1$o$0, Iq1$o$0, and reference values of second set of current command values of dq-axis Id2$o$0, Iq2$o$0 which are set when assuming that the utilization factor ratio R12 is set to 1 to 1.

The distribution unit 31 distributes the total torque command value which makes the rotary machine 1 output to the first set and the second set at a distribution ratio of reference state, and sets the first set of torque command value and the second set of torque command value. The distribution ratio of reference state is set to 50%. The total torque command value may be calculated inside the controller 30, and may be transmitted from the apparatus outside the controller 30.

in the present embodiment, since the rotary machine 1 is a non-salient pole machine, torque is proportional to the current of q-axis, and it is configured that the current command values of dq-axis are set by the Id=0 control. Accordingly, the q-axis current command value is directly used as the torque command value. The q-axis current command value may be set via the torque command value.

Then, as shown in the next equation, the distribution unit 31 sets a reference value of total current command value of q-axis Iqallo0; and distributes the reference value of total current command value of q-axis Iqallo0 to a reference value of first set of current command value of q-axis Iq1$o$0 and a reference value of second set of current command value of q-axis Iq2$o$0 at the distribution ratio of reference state (in this example, 50%). A reference value of first set of current command value of d-axis Id1$o$0 and a reference value of second set of current command value of d-axis Id2$o$0 are set to 0.

[Equation 5]

$$I_{q1o0} = 0.5 I_{qallo0}, I_{d1o0} = 0$$

$$I_{q2o0} = 0.5 I_{qallo0}, I_{d2o0} = 0 \quad (5)$$

Alternatively, if the rotary machine 1 is a salient pole machine, and the current command values of dq-axis are set by the maximum torque/current control or the magnetic flux weakening control, as shown in the next equation, the distribution unit 31 distributes the total torque command value Tallo to a first set of torque command value To1 and a second set of torque command value To2 at the distribution ratio of reference state (in this example, 50%). Then, the distribution unit 31 sets the reference values of first set of current command values of dq-axis Id1$o$0, Iq1$o$0 by the maximum torque/current control or the magnetic flux weakening control, based on the first set of torque command value To1, the rotational angle speed ω, and the DC voltage Vdc. The distribution unit 31 sets the reference values of second set of current command values of dq-axis Id2$o$0, Iq2$o$0 by the maximum torque/current control or the magnetic flux weakening control, based on the second set of torque command value To2, the rotational angle speed ω, and the DC voltage Vdc.

[Equation 6]

$$T_{o1} = 0.5 T_{allo}, T_{o2} = 0.5 T_{allo}$$

$$[I_{d1o0}, I_{q1o0}] = f(T_{o1}, \omega, V_{dc}), [I_{d2o0}, I_{q2o0}] = f(T_{o2}, \omega, V_{dc}) \quad (6)$$

<Step S02>

In the step S02, the distribution unit 31 calculates the average voltage utilization factor in reference state Mave0 of the first set of voltage utilization factor and the second set of voltage utilization factor corresponding to the reference values of first set of current command values of dq-axis Id1$o$0, Iq1$o$0 and the reference values of second set of current command values of dq-axis Id2$o$0, Iq2$o$0. In the present embodiment, since electric constants, such as winding resistor and inductance of each set, are mutually equal, the first set of voltage utilization factor in reference state and the second set of voltage utilization factor in reference state become equal mutually. Accordingly, the first set of voltage utilization factor in reference state (or the second set of voltage utilization factor in reference state) is calculated as the average voltage utilization factor in reference state Mave0. If the first set and the second set of voltage utilization factors in reference state do not become equal mutually, the first set and the second set of voltage utilization factors in reference state are calculated, and the average voltage utilization factor in reference state Mave0 may be calculated by averaging these.

As shown in the next equation, the distribution unit 31 calculates first set of voltages of dq-axis in reference state Vd10, Vg10, based on the reference values of first set of current command values of dq-axis Id1$o$0, Iq1$o$0, and the rotational angle speed ω, using a voltage equation. In the voltage equation, it is assumed that it is in the steady state, and the terms of differentiation are omitted. Then, the distribution unit 31 calculates the first set of voltage utilization factor in reference state M10, based on the first set of voltages of dq-axis in reference state Vd10, Vq10; and calculates the first set of voltage utilization factor in reference state M10 as the average voltage utilization factor in reference state Mave0.

[Equation 7]

$$\begin{bmatrix} V_{d10} \\ V_{q10} \end{bmatrix} = \begin{bmatrix} R & -\omega L_q \\ \omega L_d & R \end{bmatrix} \begin{bmatrix} I_{d1o0} \\ I_{q1o0} \end{bmatrix} + \begin{bmatrix} 0 \\ \omega \Psi_a \end{bmatrix} \quad (7)$$

$$M_{ave0} = M_{10} = \frac{\sqrt{2}\sqrt{V_{d10}^2 + V_{q10}^2}}{V_{dc}}$$

Herein, Ld is a d-axis inductance, Lq is a q-axis inductance, R is a resistance value of the armature windings, and Ψa is an interlinkage flux of the magnet of the rotor.

<Step S03>

In the step S03, the distribution unit 31 determines whether or not the average voltage utilization factor in reference state Mave0 is greater than or equal to the threshold value Mth. When it is greater than or equal to the threshold value Mth, it advances to the step S04 and the utilization factor ratio R12 is changed from 1 to 1. When it is less than the threshold value Mth, it advances to the step S07 and the utilization factor ratio R12 is set to 1 to 1.

In the present embodiment, as described later using FIG. 7, the threshold value Mth is set (in this example, 50%) corresponding to the average voltage utilization factor at which the effective value of the bus line AC component becomes the maximum with respect to a change of the average voltage utilization factor Mave in a condition where the utilization factor ratio R12 is set to 1 to 1. For example, the threshold value Mth may be set within a range of +10 to −10% of the average voltage utilization factor at which the effective value becomes the maximum.

The threshold value Mth is set to 50% of the maximum voltage utilization factor (in this example, 100%) in a range of the voltage utilization factor to be set. When the average voltage utilization factor in reference state Mave0 becomes 50% or more, even if one set of voltage utilization factor is set to 100%, the other set of voltage utilization factor can be set to 0% or more, and the voltage utilization factors of both sets can be set appropriately.

<Step S04>

In the step S04, when changing the utilization factor ratio R12 from 1 to 1, the distribution unit 31 sets the first set of target voltage utilization factor MoH, based on the average voltage utilization factor in reference state Mave0, so that the first set of voltage utilization factor M1 becomes higher than the second set of voltage utilization factor M2. For example, by referring to a target utilization factor setting map data in which a relation between the average voltage utilization factor Mave and the first set of target voltage utilization factor MoH is preliminarily set, the distribution unit 31 calculates the first set of target voltage utilization factor MoH corresponding to the average voltage utilization factor in reference state Mave0.

In the present embodiment, when changing the utilization factor ratio R12 from 1 to 1, the distribution unit 31 sets the first set of target voltage utilization factor MoH to the maximum voltage utilization factor (in this example, 100%) in the range of the voltage utilization factor to be set.

Figure 7:
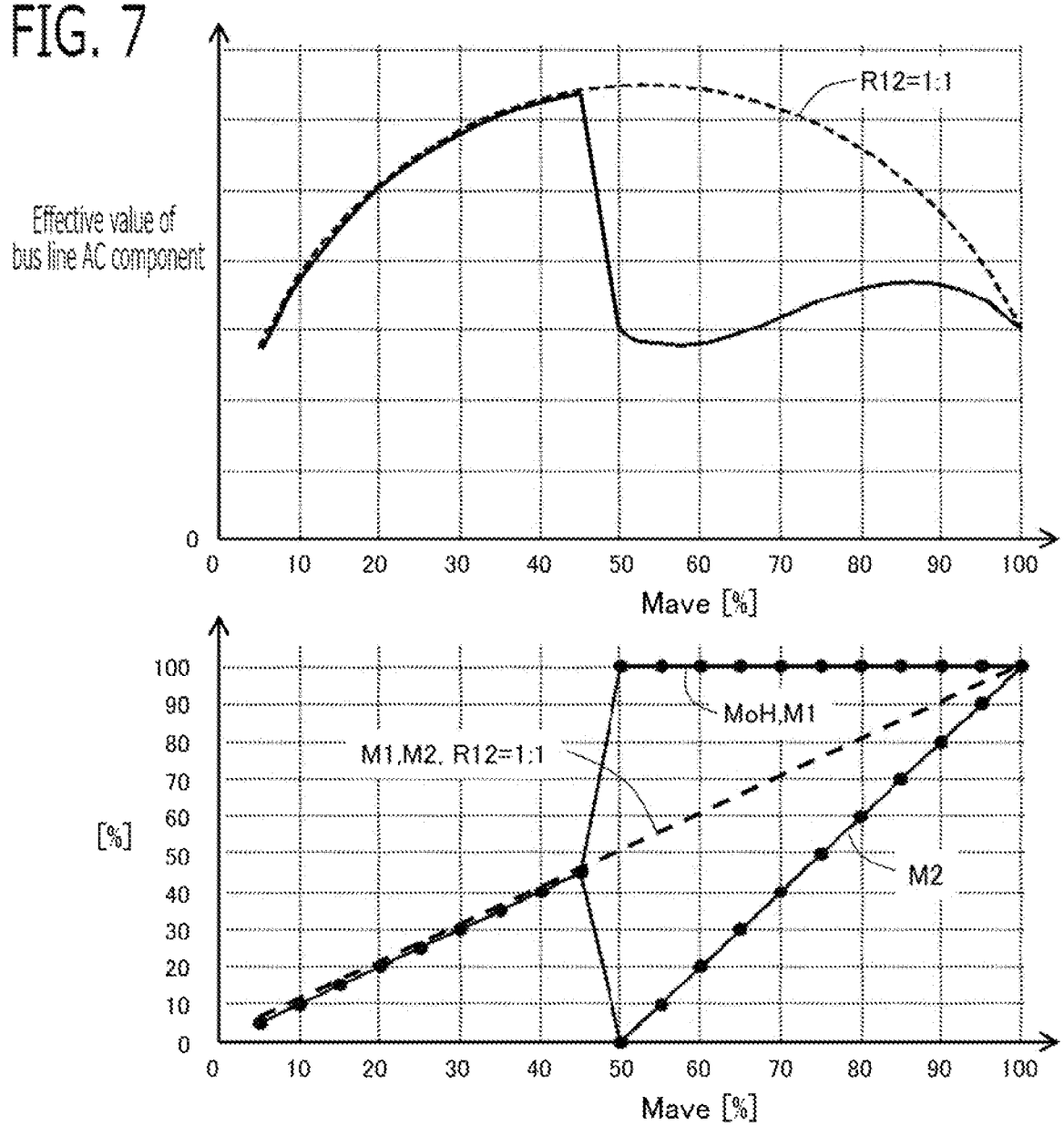
FIG. 7 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to Embodiment 1.

In the upper stage graph of FIG. 7, a dashed line shows a characteristic of a change of the effective value of the bus line AC component with respect to a change of the average voltage utilization factor Mave in the case where the utilization factor ratio R12 is set to 1 to 1. In the lower stage graph of FIG. 7, a dashed line shows the voltage utilization factors M1, M2 of each set with respect to the average voltage utilization factor Mave in this case. When the average voltage utilization factor Mave is 50%, the effective value of the bus line AC component becomes the maximum. As the average voltage utilization factor Mave increases or decreases from 50%, the effective value of the bus line AC component decreases gradually. When Mave=100% or 0%, it becomes the minimum. This is because of the following reasons. About each set, when the voltage utilization factor is 50%, among the on-off patterns (voltage vectors) of the plurality of switching devices of the inverter, a setting rate of the effective vector and a setting rate of the zero vector become equal at 50%. In the effective vector, current flows into the inverter from the DC power source 5. In the zero vector, current flows into the DC power source 5 from the inverter. By setting the effective vector and the zero vector alternately, the AC component is generated in bus current. When the setting rate of the effective vector and the setting rate of the zero vector are equal, the effective value of the bus line AC component becomes the maximum. Then, as the setting rate of the effective vector and the setting rate of the zero vector shift from 50%, the effective value of the bus line AC component decreases gradually. When the setting rate of the effective vector or the zero vector becomes 100%, the effective value of the bus line AC component becomes the minimum.

In the upper stage graph of FIG. 7, a solid line shows the effective value of the bus line AC component in the case where the first set of target voltage utilization factor MoH is set to 100%. In the lower stage graph of FIG. 7, a solid line shows the voltage utilization factors M1, M2 of each set with respect to the average voltage utilization factor Mave in this case. By setting the first set of target voltage utilization factor MoH to 100%, the effective value of the bus line AC component generated by the first set can be minimized. Especially, in the vicinity of the average voltage utilization factor Mave of 50% at which the effective value of the bus line AC component becomes the maximum value, the second set of voltage utilization factor can be decreased from 50%, and the effective value of the bus line AC component generated by the second set can be decreased. Accordingly, the effective value of the total bus line AC component can be reduced significantly compared with the case where the utilization factor ratio R12 is set to 1 to 1. In this way, in a region where the average voltage utilization factor Mave becomes 50% or more, the distribution unit 31 changes the first set of voltage utilization factor and the second set of voltage utilization factor so that the effective value of the bus line AC component becomes minimum.

<Step S05>

Then, in the step S05, the distribution unit 31 calculates the first set of current command values of dq-axis Id1o, Iq1o, based on the first set of target voltage utilization factor MoH and the rotational angle speed co of the rotor, so that a first set of voltage utilization factor M1 of applied voltages coincides with a first set of target voltage utilization factor MoH.

As shown in the equation (7), if the voltage equation in the steady state is used, a relation shown in the next equation is established between the first set of voltage utilization factor M1, and the first set of current command values of dq-axis Id1o, Iq1o. And, the first set of current command values of dq-axis Id1o, Iq1o that the first set of voltage utilization factor M1 coincides with the first set of target voltage utilization factor MoH may be calculated.

[Equation 8]

$$\begin{bmatrix} V_{d1o} \\ V_{q1o} \end{bmatrix} = \begin{bmatrix} R & -\omega L_q \\ \omega L_d & R \end{bmatrix} \begin{bmatrix} I_{d1o} \\ I_{q1o} \end{bmatrix} + \begin{bmatrix} 0 \\ \omega \Psi_a \end{bmatrix} \quad (8)$$

$$M_1 = \frac{\sqrt{2}\sqrt{V_{d1o}^2 + V_{q1o}^2}}{V_{dc}} = M_{oH}$$

In the present embodiment, since the Id=0 control is performed, when Id1o=0 is substituted for the equation (8) and it is rearranged with regard to Iq1o, the next equation is obtained.

[Equation 9]

$$aI_{q1o}^2 + bI_{q1o} + c = 0 \quad (9)$$

$$a = (\omega L_q)^2 + R^2$$

$$b = 2R\omega\Psi_a$$

$$c = (\omega\Psi_a)^2 - \frac{V_{dc}^2}{2}M_{oH}^2$$

When the equation (9) is solved for Iq1o, the next equation is obtained. Using the calculation equation of each order coefficient a, b, c of the equation (9) and the next equation, the distribution unit 31 calculates the first set of current command value of q-axis Iq1o, based on the first set of target voltage utilization factor MoH, the rotational angle speed c), and the DC voltage Vdc. Electric constants, such as the winding resistor value R, the inductance, and the interlinkage flux Ta of the magnet of the rotor, are preliminarily set. The DC voltage Vdc may be a preliminarily set fixed value. When outputting negative torque, the sign of the term of square root of the equation (10) becomes minus.

[Equation 10]

$$I_{q1o} = \frac{-b + \sqrt{b^2 - 4ac}}{2a}, I_{d1o} = 0 \tag{10}$$

Alternatively, if the current command values of dq-axis are set by the maximum torque/current control, when the next equation is substituted for Id1*o* of the equation (8) and it is rearranged with regard to Iq1*o*, similarly to the equation (9), a quadratic function of Iq1*o* is obtained, and a calculation equation of each order coefficient a, b, c is obtained (equation derivation is omitted). Then, using the calculation equation of each order coefficient a, b, c and the equation (10), the distribution unit 31 calculates the first set of current command value of q-axis Iq1*o*, based on the first set of target voltage utilization factor MoH, the rotational angle speed ω), and the DC voltage Vdc. Then, using the equation (11), the distribution unit 31 calculates the first set of current command value of d-axis Id1*o*, based on the calculated first set of current command value of q-axis Iq1*o*.

[Equation 11]

$$I_{d1o} = \frac{\Psi_a}{2(L_q - L_d)} - \sqrt{\frac{\Psi_a^2}{4(L_q - L_d)^2} + I_{q1o}^2} \tag{11}$$

Alternatively, if the current command values of dq-axis are set by the magnetic flux weakening control, when the next equation is substituted for Id1*o* of the equation (8) and it is rearranged with regard to Iq1*o*, similarly to the equation (9), a quadratic function of Iq1*o* is obtained, and a calculation equation of each order coefficient a, b, c is obtained (equation derivation is omitted). Then, using the calculation equation of each order coefficient a, b, c and the equation (10), the distribution unit 31 calculates the first set of current command value of q-axis Iq1*o*, based on the first set of target voltage utilization factor MoH, the rotational angle speed ω, and the DC voltage Vdc. Then, using the equation (12), the distribution unit 31 calculates the first set of current command value of d-axis Id1*o*, based on the calculated first set of current command value of q-axis Iq1*o*.

[Equation 12]

$$I_{d1o} = \frac{-\Psi_a + \sqrt{\left(\frac{V_{dc}}{\omega}\right)^2 - (L_q I_{q1o})^2}}{L_d} \tag{12}$$

Alternatively, as shown in the next equation, by referring to a q-axis current setting map data MAPiq in which a relation between the target voltage utilization factor MoH, the rotational angle speed ω, the DC voltage Vdc, and the first set of current command value of q-axis Iq1*o* is preliminarily set using the equation (8) to the equation (12) and the like, the distribution unit 31 may calculate the first set of current command value of q-axis Iq1*o* corresponding to the actual target voltage utilization factor MoH, the actual rotational angle speed ω, and the actual DC voltage Vdc. In the case of the maximum torque/current control or the magnetic flux weakening control, as shown in the next equation, by referring to a d-axis current setting map data MAPid in which a relation between the target voltage utilization factor MoH, the rotational angle speed ω, the DC voltage Vdc, and the first set of current command value of d-axis Id1*o* is preliminarily set using the equation (8) to the equation (12) and the like, the distribution unit 31 may calculate the first set of current command value of d-axis Id1*o* corresponding to the actual target voltage utilization factor MoH, the actual rotational angle speed ω, and the actual DC voltage Vdc.

[Equation 13]

$$I_{q1o} = \text{MAPiq}(M_{oH}, \omega, V_{dc})$$

$$I_{d1o} = \text{MAPid}(M_{oH}, \omega, Vdc) \tag{13}$$

<Step S06>

In the step S06, the distribution unit 31 calculates the second set of current command values of dq-axis Id2*o*, Iq2*o*, based on the first set of current command values of dq-axis Id1*o*, Iq1*o*, so that the total torque of the first set of torque by the magnetic flux of the first set of three-phase armature windings and the second set of torque by the magnetic flux of the second set of three-phase armature windings coincides with the total torque command value.

In the present embodiment, the Id=0 control is performed, torque is proportional to the current of q-axis. The distribution unit 31 calculates the second set of current command value of q-axis Iq2*o*, based on the first set of current command value of q-axis Iq1*o*, so that a total of the first set of current command value of q-axis Iq1*o* and the second set of current command value of q-axis Iq2*o* coincides with a total of the reference value of first set of current command value of q-axis Iq1*o*0 and the reference value of second set of current command value of q-axis Iq2*o*0. Specifically, as shown in the next equation, the distribution unit 31 sets the second set of current command value of q-axis Iq2*o*, by subtracting the first set of current command value of q-axis Iq1*o* from the reference value of total current command value of q-axis Iqallo0.

[Equation 14]

$$I_{q2o} = I_{qallo0} - I_{q1o}, I_{d2o} = 0 \tag{14}$$

Alternatively, if the rotary machine 1 is a salient pole machine and the maximum torque/current control or the magnetic flux weakening control is performed, as shown in the next equation, the distribution unit 31 calculates the first set of torque T1 by the magnetic flux of the first set of three-phase armature windings, based on the first set of current command values of dq-axis Id1*o*, Iq1*o*. Herein, Pn is the number of pole pairs. Then, the distribution unit 31 calculates the second set of torque T2 by subtracting the first set of torque T1 from the total torque command value Tall*o*. Then, the distribution unit 31 calculates the second set of current command values of dq-axis Id2*o*, Iq2*o*, based on the second set of torque T2, the rotational angle speed ω, and the DC voltage Vdc, by the maximum torque/current control or the magnetic flux weakening control.

[Equation 15]

$$T_1 = P_n\{\Psi_a I_{q1o} + (L_d - L_q) I_{d1o} I_{q1o}\}$$

$$T_2 = T_{allo} - T_1$$

$$I_{d2o} = K(T_2, \omega, V_{dc}), I_{q2o} = f(T_2, \omega, V_{dc}) \tag{15}$$

In the present embodiment, when changing the utilization factor ratio R12 from 1 to 1, the distribution unit 31 performs a limitation processing which limits the first set of current command value by a limit value; and changes the second set of current command value so that the second set of torque increases by a decrease amount of the first set of torque decreased by limitation.

For example, in the case of the non-salient pole machine, the distribution unit 31 upper-limits the first set of current command value of q-axis Iq1o by a limit value of q-axis; and adds the decrease amount of the first set of current command value of q-axis decreased by the upper limitation, to the second set of current command value of q-axis Iq2o. Alternatively, in the case of the salient pole machine, the distribution unit 31 may upper-limit a magnitude of a vector of the first set of current command values of dq-axis Id1o, Iq1o by a limit value; may calculate the first set of torque T1, based on the first set of current command values of dq-axis Id1o, Iq1o after upper limitation, using the first equation of the equation (15), when upper-limiting; and may calculate the second set of current command values of dq-axis Id2o, Iq2o by the second equation and the third equation of the equation (15).

When the utilization factor ratio R12 is changed from 1 to 1, the first set of current increases more than the case where it is not changed, and the heat generation of the first set of armature windings and the inverter increases. According to the above configuration, by limiting the first set of current, while preventing overheating of the first set, the second set torque is increased by the decrease amount of first set torque decreased by the current limitation of first set, and the total torque can be suppressed from changing.

<Step S07>

In the step S07, the distribution unit 31 calculates the current command values of dq-axis of each set which make the utilization factor ratio R12 become 1 to 1. In the present embodiment, as shown in the next equation, the distribution unit 31 sets the reference values of first set of current command values of dq-axis Id1o0, Iq1o0 as the first set of current command values of dq-axis Id1o, Iq1o; and sets the reference values of second set of current command values of dq-axis Id2o0, Iq2o0 as the second set of current command values of dq-axis Id2o, Iq2o.

[Equation 16]

$$I_{d1o}=I_{d1o0}, I_{q1o}=I_{q1o0}$$

$$I_{d2o}=I_{d2o0}, I_{q2o}=I_{q2o0} \quad (16)$$

2. Embodiment 2

The controller 30 for rotary machine according to Embodiment 2 will be explained with reference to drawings. The explanation for constituent parts the same as those in Embodiment 1 will be omitted. The basic configuration of the rotary machine 1 and the controller 30 for rotary machine according to the present embodiment is the same as that of Embodiment 1. A range of the average voltage utilization factor Mave where the utilization factor ratio R12 is changed from 1 to 1 is different from Embodiment 1.

In Embodiment 1, the threshold value Mth is set to 50%. And, when the average voltage utilization factor Mave is greater than or equal to 50%, the distribution unit 31 changes the utilization factor ratio R12 from 1 to 1. When the average voltage utilization factor Mave is less than 50%, the distribution unit 31 set the utilization factor ratio R12 to 1 to 1. In the present embodiment, even when the average voltage utilization factor Mave is less than 50%, the distribution unit 31 changes the utilization factor ratio R12 from 1 to 1.

For example, in the lower stage graph of FIG. 8, a solid line shows the voltage utilization factor of each set with respect to the average voltage utilization factor Mave according to the present embodiment. In the upper stage graph of FIG. 8, a solid line shows the effective value of the bus line AC component with respect to the average voltage utilization factor Mave in this case. Similarly to FIG. 7, for comparison, a dashed line shows the effective value of the bus line AC component and the voltage utilization factor of each set in the case of setting the utilization factor ratio R12 to 1 to 1.

In the present embodiment, over the whole region of the average voltage utilization factor Mave (0% to 100%), the distribution unit 31 calculates the first set of current command value and the second set of current command value which make the utilization factor ratio R12 change from 1 to 1, so that the effective value of the bus line AC component decreases less than the case where the utilization factor ratio R12 is 1 to 1. Even in the region where the average voltage utilization factor Mave is 50% or less, the distribution unit 31 changes the first set of voltage utilization factor and the second set of voltage utilization factor so that the effective value of the bus line AC component should become the minimum.

For example, in a range where the average voltage utilization factor Mave is 50% to 40%, the distribution unit 31 decreases gradually the first set of target voltage utilization factor MoH from 100% as the average voltage utilization factor Mave decreases, so that the second set of voltage utilization factor becomes 0%. In this range, a decrease of the effective value of the bus line AC component of the second set by setting the second set of voltage utilization factor to 0% exceeds an increase of the effective value of the bus line AC component of the first set by decreasing the first set of voltage utilization factor from 100%; and the whole effective value of the bus line AC component can be minimized.

In a range where the average voltage utilization factor Mave is 40% to 0%, the distribution unit 31 increases the second set of voltage utilization factor more than 0%, and decreases the first set of voltage utilization factor by its increment, so that the whole effective value of the bus line AC component becomes the minimum.

A relation between the average voltage utilization factor Mave and the first set of target voltage utilization factor MoH that the whole effective value of the bus line AC component becomes the minimum is previously determined by arithmetic operation or experiment. And, the target utilization factor setting map data like the solid line of the lower stage graph of FIG. 8 is preliminarily set.

The first set of target voltage utilization factor MoH which makes the effective value of the bus line AC component becomes the minimum is not necessary to be set. Considering other factors, for example, suppression of heat generation of the armature winding and the inverter of set in which the voltage utilization factor is made high, and easiness of control, the first set of target voltage utilization factor MoH which can reduce the effective value of the bus line AC component less than the case where the utilization factor ratio R12 is 1 to 1 may be set.

Figure 6:
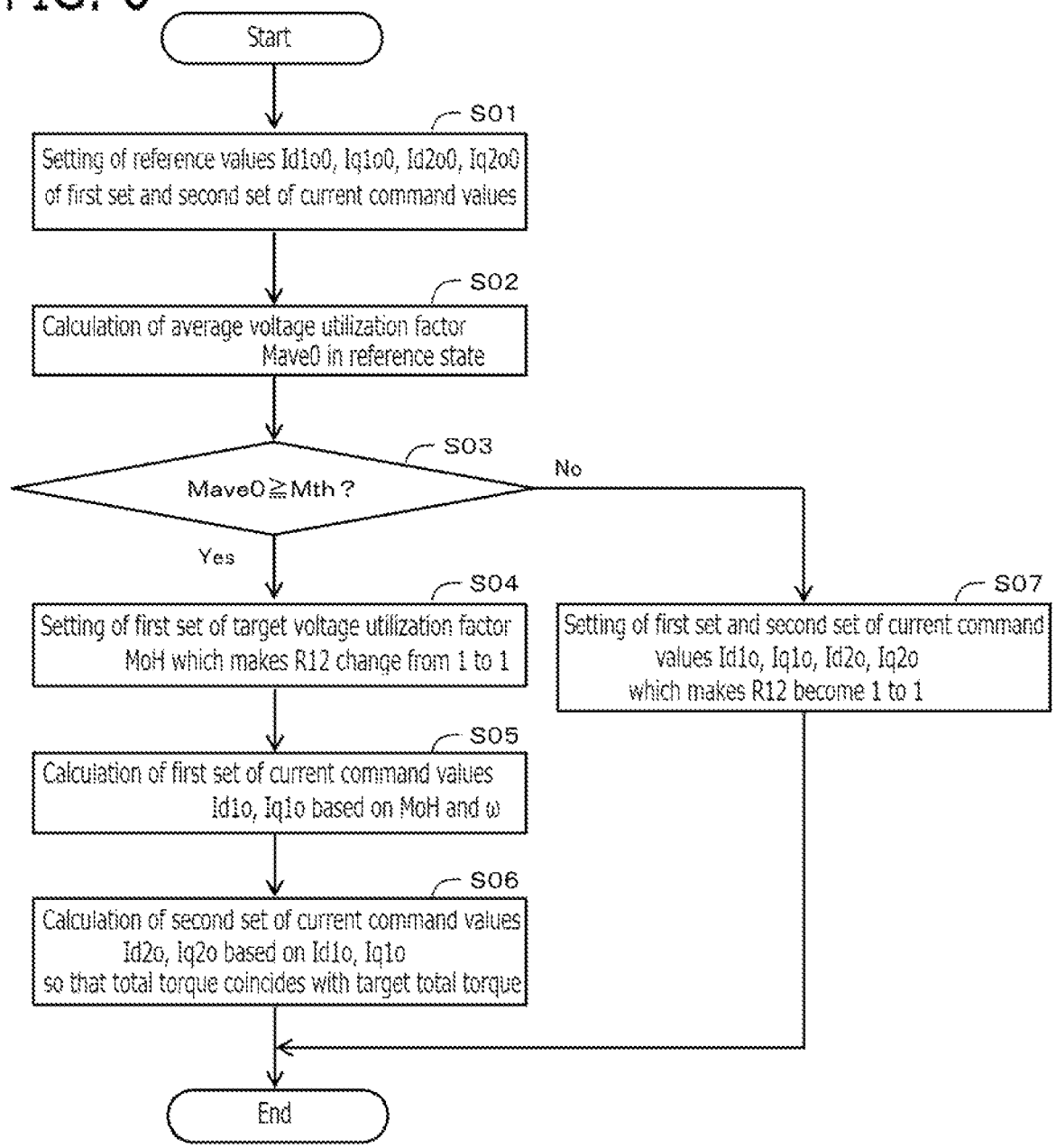
FIG. 6 is a flowchart explaining processing of the distribution unit according to Embodiment 1.

In the present embodiment, in the flowchart of FIG. 6, the step S03 and the step S07 which are processing in the case of setting the utilization factor ratio R12 to 1 to 1 are not executed. The step S01, the step S02, the step S04, the step S05, and the step S06 are executed in this order.

In Embodiments 1 and 2, as shown in FIG. 3, the phase difference in the electrical angle of the position of the second set of three-phase armature windings with respect to the position of the first set of three-phase armature windings is set to 0 degree. However, the phase difference may be set to other than 0 degree (for example, 30 degrees). For example, in FIG. 9, a solid line shows the setting value of the voltage utilization factor of each set and the effective value of the bus line AC component which make the effective value of the bus line AC component become the minimum in the case of the phase difference=30 degrees. For comparison, a dashed line shows the effective value of the bus line AC component and the voltage utilization factor of each set in the case of setting the utilization factor ratio R12 to 1 to 1. Even if the phase difference is other than 0 degree, by changing the utilization factor ratio R12 from 1 to 1, the effective value of the bus line AC component can be decreased. This is also applicable to following embodiments.

In Embodiments 1 and 2, the controller 30 is provided with the first set of controller 30a and the second set of controller 30b, and control of each set is individually executed by the controller of each set. However, the controller 30 may be provided with one controller and control of each set may be executed by one controller. Alternatively, the controller 30 is provided with three or more controllers, and the distribution unit 31 may be executed by the third controller. This is also applicable to following embodiments.

If the first set of controller 30a and the second set of controller 30b are provided, the first set of carrier wave and the second set of carrier wave may be synchronized between two controllers. But, even if not being synchronized, by changing the utilization factor ratio R12 from 1 to 1, the effective value of the bus line AC component can be decreased. On the other hand, in the technology of patent document 1, it is necessary to synchronize between two sets in order to distribute the effective vector on the time-axis. But, the present disclosure does not require such synchronization, the increase in apparatus cost for synchronizing can be suppressed. And, the PWM period of first set and the PWM period of second set may be different. This is also applicable to following embodiments.

3. Embodiment 3

The controller 30 for rotary machine according to Embodiment 3 will be explained with reference to drawings. The explanation for constituent parts the same as those in Embodiment 1 will be omitted. The basic configuration of the rotary machine 1 and the controller 30 for rotary machine according to the present embodiment is the same as that of Embodiment 1. Embodiment 3 is different from Embodiment 1 in that a magnetic flux strengthening is performed in order to make the voltage utilization factor increase.

In Embodiments 1 and 2, as shown in FIG. 7 and FIG. 8, when the average voltage utilization factor is greater than or equal to 50%, one set of voltage utilization factor is increased to 100%, and the effective value of the bus line AC component is decreased. On the other hand, when the average voltage utilization factor is less than 50%, since the other set of voltage utilization factor cannot be set to a negative value, one set of voltage utilization factor cannot be increased to 100%. If correcting the current command value so that the magnetic flux of the rotor is strengthened, the voltage utilization factor can be increased without changing torque. Accordingly, even when the average voltage utilization factor is less than 50%, one set of voltage utilization factor can be increased to 100%.

Then, in the present embodiment, when the average voltage utilization factor if not performing correction by the current correction value is less than the threshold value Mth, the distribution unit 31 calculates the current correction value which strengthens the magnetic flux of the rotor so that the average voltage utilization factor if performing correction by the current correction value becomes greater than or equal to the threshold value Mth. Then, the distribution unit 31 calculates the first set of current command value and the second set of current command value which are corrected by the current correction value and make the utilization factor ratio R12 change from 1 to 1. On the other hand, when the average voltage utilization factor if not performing correction by the current correction value is greater than or equal to the threshold value Mth, similarly to Embodiment 1, the distribution unit 31 calculates the first set of current command value and the second set of current command value which are not corrected by the current correction value and make the utilization factor ratio R12 change from 1 to 1.

According to this configuration, even when the average voltage utilization factor if not performing correction by the current correction value is less than the threshold value Mth, the average voltage utilization factor is increased to the threshold value Mth or more by the current correction which strengthens the magnetic flux of the rotor; one set of voltage utilization factor can be increased more than the case where the current correction is not performed; and the effective value of the bus line AC component can be decreased.

<Flowchart>

With reference to the flowchart of FIG. 10, detailed processing of the distribution unit 31 according to the present embodiment will be explained. In the step S11, similarly to the step S01 of Embodiment 1, the distribution unit 31 sets the reference values of first set of current command values of dq-axis Id1o0, Iq1o0 and the reference values of second set of current command values of dq-axis Id2o0, Iq2o0 which are set when assuming that the utilization factor ratio R12 is set to 1 to 1 and a correction by a current correction value of d-axis ΔId is not performed.

In the step S12, similarly to the step S02 of Embodiment 1, the distribution unit 31 calculates the average voltage utilization factor in reference state Mave0 of the first set of voltage utilization factor and the second set of voltage utilization factor corresponding to the reference values of first set of current command values of dq-axis Id1o0, Iq1o0 and the reference values of second set of current command values of dq-axis Id2o0, Iq2o0.

In the step S13, similarly to the step S03 of Embodiment 1, the distribution unit 31 determines whether or not the average voltage utilization factor Mave0 in the reference state where the correction by the current correction value of d-axis ΔId is not performed is greater than or equal to the threshold value Mth. When it is greater than or equal to the threshold value Mth, it advances to the step S14, and when it is less than the threshold value Mth, it advances to the step S17. In the present embodiment, the threshold value Mth is set to 50% of the maximum voltage utilization factor (in this example, 100%) in a range of the voltage utilization factor to be set.

In the step S14, similarly to the step S04 of Embodiment 1, the distribution unit 31 sets the first set of target voltage utilization factor MoH, based on the average voltage utilization factor in reference state Mave0, so that the first set of voltage utilization factor M1 becomes higher than the second set of voltage utilization factor M2. In the present embodiment, the distribution unit 31 sets the first set of target voltage utilization factor MoH to the maximum voltage utilization factor (in this example, 100%) in the range of the voltage utilization factor to be set.

In the step S15, similarly to the step S05 of Embodiment 1, the distribution unit 31 calculates the first set of current command values of dq-axis Id1*o*, Iq1*o*, based on the first set of target voltage utilization factor MoH and the rotational angle speed 6 of the rotor, so that a first set of voltage utilization factor M1 of applied voltages coincides with a first set of target voltage utilization factor MoH.

In the step S16, similarly to the step S06 of Embodiment 1, the distribution unit 31 calculates the second set of current command values of dq-axis Id2*o*, Iq2*o*, based on the first set of current command values of dq-axis Id1*o*, Iq1*o*, so that the total torque of the first set of torque and the second set of torque coincides with the total torque command value.

On the other hand, in the step S17, the distribution unit 31 calculates the current correction value of d-axis ΔId which strengthens the magnetic flux of the rotor so that the average voltage utilization factor Mavecr if performing correction by the current correction value of d-axis ΔId becomes greater than or equal to the threshold value Mth. For example, as shown in the next equation, the distribution unit 31 calculates the current correction value of d-axis ΔId so that a reference value of first set of voltage utilization factor after current correction M10*cr* calculated based on a reference value of current command value of d-axis after current correction Id1*o*0+ΔId obtained by adding the current correction value of d-axis ΔId to the reference value of first set of current command value of d-axis Id1*o*0, and the reference value of first set of current command value of q-axis Iq1*o*0 coincides with the threshold value Mth. For example, by iterative calculation, the current correction value of d-axis ΔId which satisfies the equation (17) is searched. Alternatively, using an algebraic equation or a map data which uses the reference values of first set of current command values of dq-axis Id1*o*0, Iq1*o*0, the rotational angle speed ω, and the DC voltage Vdc as arguments, the current correction value of d-axis ΔId may be calculated. The current correction value of d-axis ΔId becomes a positive value. The current correction value of d-axis ΔId is upper-limited by an upper limit value. The reference value of second set may be used instead of the reference value of first set.

[Equation 17]

$$\begin{bmatrix} V_{d10cr} \\ V_{q10cr} \end{bmatrix} = \begin{bmatrix} R & -\omega L_q \\ \omega L_d & R \end{bmatrix} \begin{bmatrix} I_{d1o0} + \Delta I_{dq} \\ I_{q1o0} \end{bmatrix} + \begin{bmatrix} 0 \\ \omega \Psi_a \end{bmatrix} \quad (17)$$

$$M_{10cr} = \frac{\sqrt{2}\sqrt{V_{d10cr}^2 + V_{q10cr}^2}}{V_{dc}} = M_{th}$$

Figure 11:
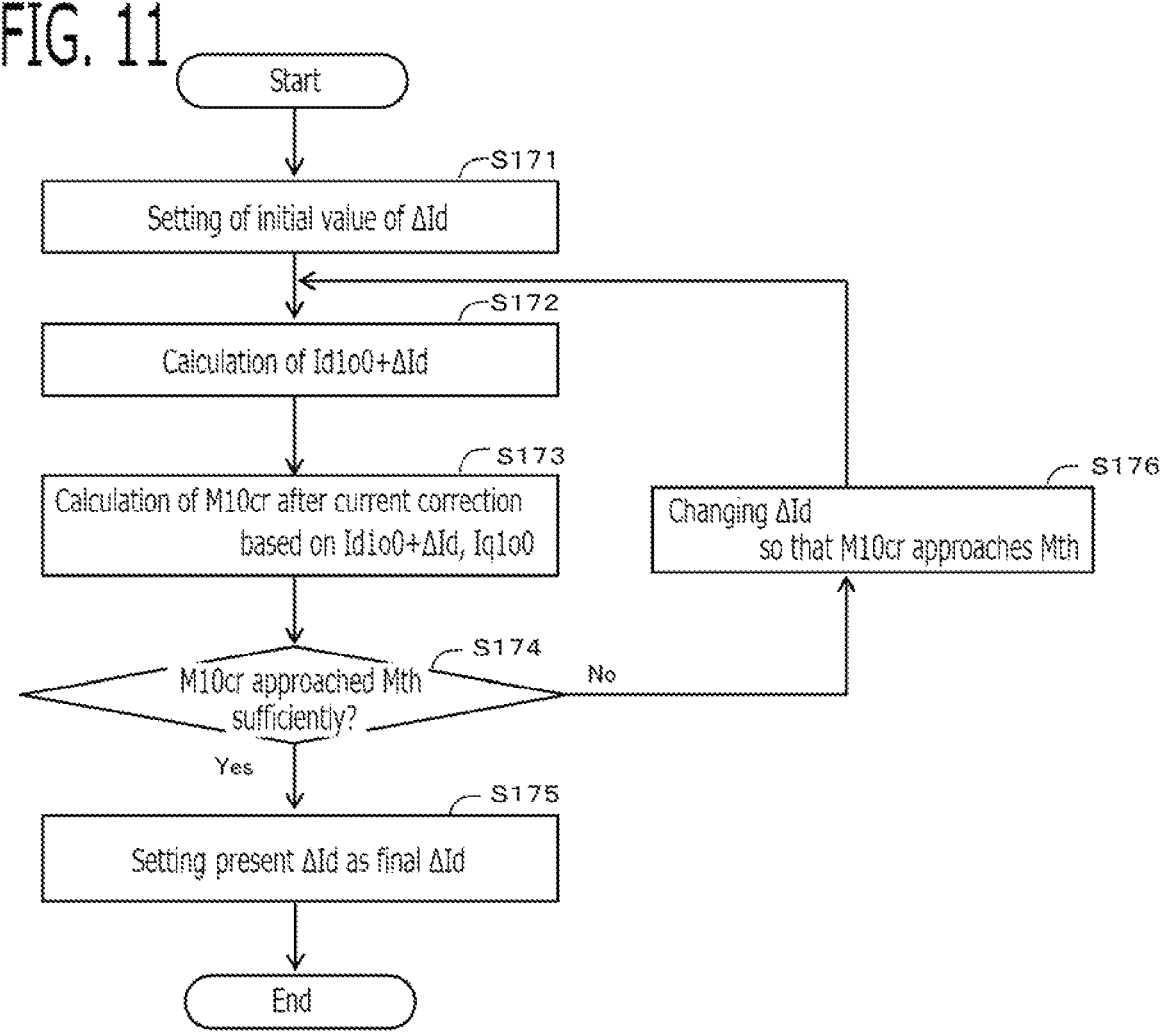
FIG. 11 is a flowchart explaining processing of iterative calculation of the distribution unit according to Embodiment 3.

An example in the case of performing iterative calculation will be explained with reference to the flowchart of FIG. 11. In the step S171, the distribution unit 31 sets the initial value (in this example, 0) of the current correction value of d-axis ΔId. Then, in the step S172, the distribution unit 31 calculates the reference value of current command value of d-axis after current correction Id1*o*0+ΔId by adding the present current correction value of d-axis ΔId to the reference value of first set of current command value of d-axis Id1*o*0.

Then, in the step S173, using the equation (17), the distribution unit 31 calculates the reference value of first set of voltage utilization factor after current correction M10*cr*, based on the reference value of current command value of d-axis after current correction Id1*o*0+ΔId and the reference value of first set of current command value of q-axis Iq1*o*0.

In the step S174, the distribution unit 31 determines whether or not the reference value of first set of voltage utilization factor after current correction M10*cr* approaches the threshold value Mth sufficiently (for example, determines whether or not an absolute value of deviation becomes less than or equal to a determination value). When determining that it approaches sufficiently, it advances to the step S175, and when determining that it does not approach sufficiently, it advances to the step S176. In the step S176, the distribution unit 31 changes the current correction value of d-axis ΔId so that the reference value of first set of voltage utilization factor after current correction M10*cr* approaches the threshold value Mth. After that, it returns to the step S172 and continues the iterative calculation. On the other hand, in the step S175, the distribution unit 31 sets the present current correction value of d-axis ΔId as the final current correction value of d-axis ΔId, and ends the iterative calculation.

Figure 10:
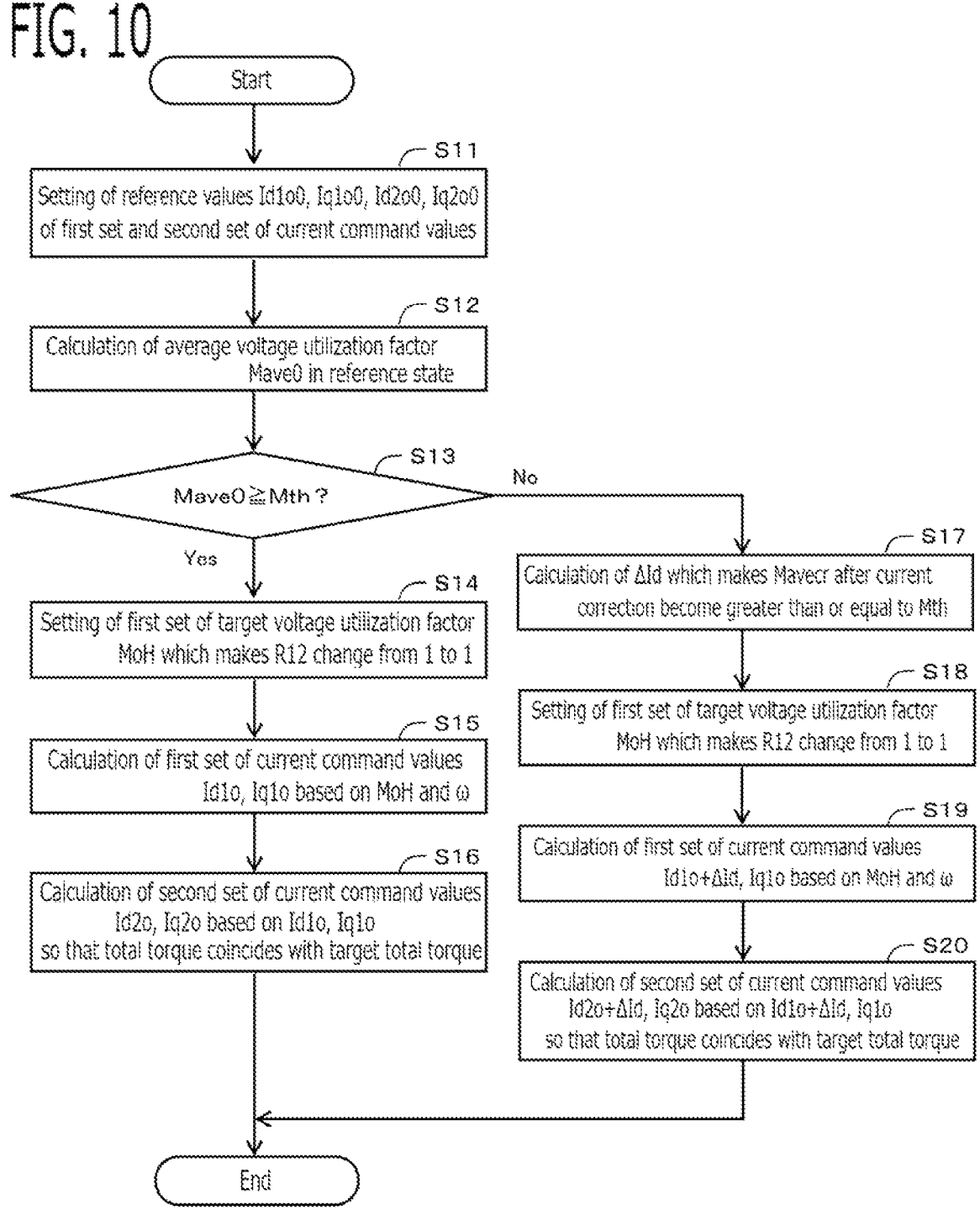
FIG. 10 is a flowchart explaining processing of the distribution unit according to Embodiment 3.

It returns to FIG. 10, in the step 318, the distribution unit 31 sets the first set of target voltage utilization factor MoH, based on the average voltage utilization factor in reference state Mave0, so that the first set of voltage utilization factor M1 becomes higher than the second set of voltage utilization factor M2. In the present embodiment, the distribution unit 31 sets the first set of target voltage utilization factor MoH to a double value of the threshold value Mth (in this example, 100%).

In the step 319, the distribution unit 31 calculates the first set of current command values of dq-axis Id1*o*+ΔId, Iq1*o* which are corrected by the current correction value of d-axis ΔId, based on the first set of target voltage utilization factor MoH and the rotational angle speed ω of the rotor, so that the first set of voltage utilization factor M1*cr* of applied voltages after current correction coincides with the first set of target voltage utilization factor MoH. In the present embodiment, since the Id=0 control is performed in the reference state, the first set of current command value of d-axis Id1*o* in the reference state becomes 0.

[Equation 18]

$$\begin{bmatrix} V_{d1o} \\ V_{q1o} \end{bmatrix} = \begin{bmatrix} R & -\omega L_q \\ \omega L_d & R \end{bmatrix} \begin{bmatrix} I_{d1o} + \Delta I_d \\ I_{q1o} \end{bmatrix} + \begin{bmatrix} 0 \\ \omega \Psi_a \end{bmatrix} \quad (18)$$

$$M_{1cr} = \frac{\sqrt{2}\sqrt{V_{d1o}^2 + V_{q1o}^2}}{V_{dc}} = M_{oH}$$

Although equation derivation is omitted, when the equation (18) is rearranged with regard to Iq1*o*, similarly to the equation (9), a quadratic function of Iq1*o* is obtained, and a calculation equation of each order coefficient a, b, c is obtained. Then, similarly to Embodiment 1, using the calculation equation of each order coefficient a, b, c and the equation (10), the distribution unit 31 calculates the first set of current command value of q-axis Iq1*o* after current correction, based on the first set of target voltage utilization factor MoH, the current correction value of d-axis ΔId, the rotational angle speed ω, and the DC voltage Vdc. Then, the distribution unit 31 calculates the current correction value of d-axis ΔId as the first set of current command value of d-axis Id1*o* after current correction.

If the rotary machine 1 is a salient pole machine and the maximum torque/current control or the magnetic flux weakening control is performed, when the equation (11) or the equation (12) is substituted for the first set of current command value of d-axis Id1*o* of the equation (18) and it is rearranged with regard to Iq1o, similarly, a quadratic function of Iq1o is obtained, and a calculation equation of each order coefficient a, b, c is obtained. Then, using the calculation equation of each order coefficient a, b, c and the equation (10), the distribution unit 31 calculates the first set of current command value of q-axis Iq1o after current correction, based on the first set of target voltage utilization factor MoH, the current correction value of d-axis ΔId, the rotational angle speed ω, and the DC voltage Vdc. Then, using the equation (11) or the equation (12), the distribution unit 31 calculates the first set of current command value of d-axis Id1o, based on the calculated first set of current command value of q-axis Iq1o after current correction; and calculates the first set of current command value of d-axis Id1o+ΔId after current correction by adding the current correction value of d-axis ΔId to the first set of current command value of d-axis Id1o.

Alternatively, similarly to Embodiment 1, as shown in the next equation, by referring to a q-axis current setting map data MAPiq in which a relation between the target voltage utilization factor MoH, the current correction value of d-axis ΔId, the rotational angle speed ω, the DC voltage Vdc, and the first set of current command value of q-axis Iq1o is preliminarily set, the distribution unit 31 may calculate the first set of current command value of q-axis Iq1o after current correction corresponding to the actual target voltage utilization factor MoH, the actual current correction value of d-axis ΔId, the actual rotational angle speed ω, and the actual DC voltage Vdc. By referring to a d-axis current setting map data MAPid in which a relation between the target voltage utilization factor MoH, the current correction value of d-axis ΔId, the rotational angle speed ω, the DC voltage Vdc, and the first set of current command value of d-axis Id1o is preliminarily set, the distribution unit 31 may calculate the first set of current command value of d-axis Id1o+ΔId after current correction corresponding to the actual target voltage utilization factor MoH, the actual current correction value of d-axis ΔId, the actual rotational angle speed ω, and the actual DC voltage Vdc.

[Equation 19]

$$I_{q1o} = \text{MAPiq}(M_{oH}, \Delta I_d, \omega, V_{dc})$$

$$I_{d1o} + \Delta I_d = \text{MAPid}(M_{oH}, \Delta I_d, \omega, V_{dc}) \quad (19)$$

In the step S20, the distribution unit 31 calculates the second set of current command values of dq-axis Id2o, Iq2o after current correction, based on the first set of current command values of dq-axis Id1o+ΔI$_d$, Iq1o after current correction, so that the total torque of the first set of torque and the second set of torque coincides with the total torque command value.

In the present embodiment, since the Id=0 control is performed, as shown in the next equation, the distribution unit 31 sets the second set of current command value of q-axis Iq2o after current correction, by subtracting the first set of current command value of q-axis Iq1o after current correction from the reference value of total current command value of q-axis Iqallo0. The distribution unit 31 calculates the current correction value of d-axis ΔId as the second set of current command value of d-axis Id2o+ΔId after current correction.

[Equation 20]

$$I_{q2o} = I_{qall o0} - I_{q1o}, I_{d2o} + \Delta I_d = \Delta I_d \quad (20)$$

If the rotary machine 1 is a salient pole machine and the maximum torque/current control or the magnetic flux weakening control is performed, the distribution unit 31 calculates the second set of current command values of dq-axis Id2o+ΔId, Iq2o after current correction so that the second set of current command value of d-axis Id2o+ΔId after current correction increases by the current correction value of d-axis ΔId from the case where the current correction is not performed, and the total torque coincides with the total torque command value Tallo.

Since the second set of voltage utilization factor is the decreased side, the second set of current command value of d-axis Id2o may be not corrected by the current correction value of d-axis ΔId. In this case, by a method similar to the step S06 of Embodiment 1, the second set of current command values of dq-axis Id2o, Iq2o are calculated.

If the average voltage utilization factor is increased in a region where the average voltage utilization factor before current correction is low, the current correction value of d-axis ΔId becomes large too much. Accordingly, in a region where the average voltage utilization factor before current correction is less than or equal to a predetermined value (for example, 20%), the current correction may be not performed, and the utilization factor ratio R12 may be set to 1 to 1.

4. Embodiment 4

Figure 12:
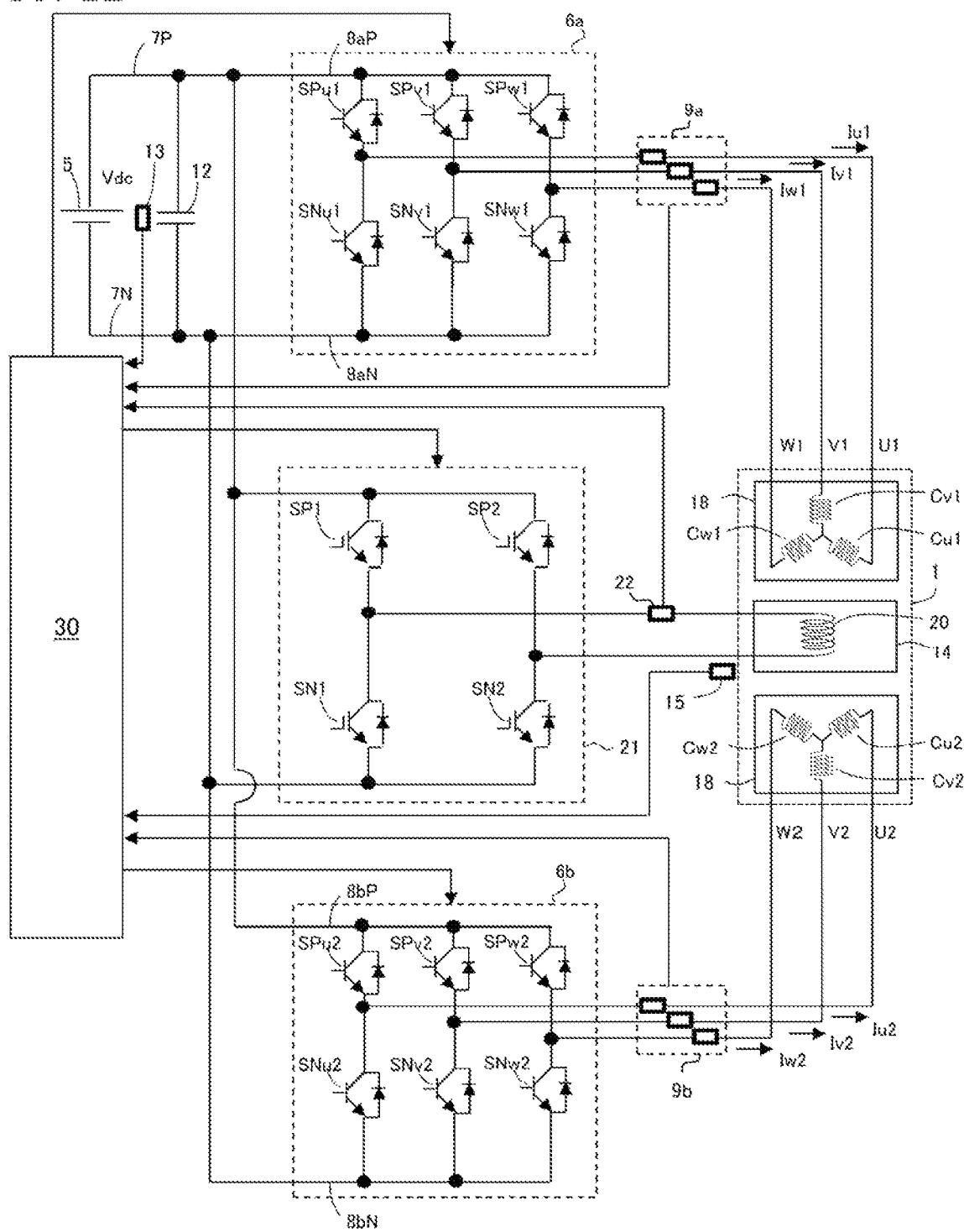
FIG. 12 is a schematic configuration diagram of the controller for rotary machine and a rotary machine according to Embodiment 4.
Figure 13:
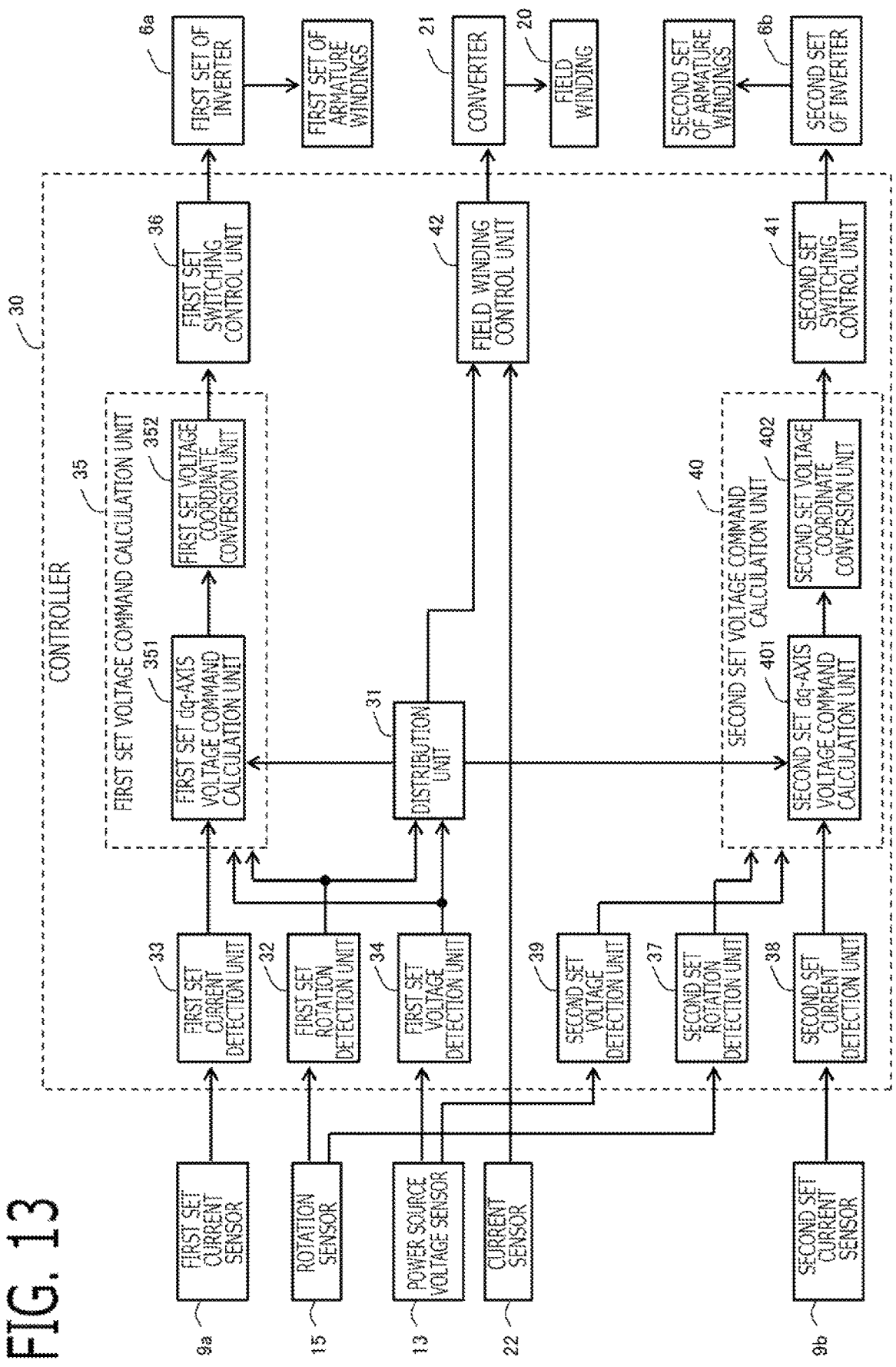
FIG. 13 is a schematic block diagram of the controller according to Embodiment 4.

The controller 30 for rotary machine according to Embodiment 4 will be explained with reference to drawings. The explanation for constituent parts the same as those in Embodiment 1 will be omitted. The basic configuration of the rotary machine 1 and the controller 30 for rotary machine according to the present embodiment is the same as that of Embodiment 1. A field winding 20 which generates a field of the rotor is provided, and the controller 30 is provided with a field winding control unit 42 which applies voltage to the field winding 20. FIG. 12 and FIG. 13 show the schematic configuration diagram of the rotary machine 1 and the controller 30. The first set of controller 30a is provided with the field winding control unit 42. Alternatively, the second set of controller 30b or a third controller may be provided with the field winding control unit 42. The field winding 20 may be provided in other than the rotor, for example, near the stator or the rotor.

The converter 21 is provided with switching devices and performs power conversion between the DC power source 5 and the field winding 20. In the present embodiment, the converter 21 is H bridge circuit which is provided with two series circuits in each of which a high potential side switching device SP connected to the high potential side of the DC power source 5 and a low potential side switching device SN connected to the low potential side of the DC power source 5 are connected in series. The converter 21 may be any circuit configuration of switching devices which can perform power conversion. A current sensor 22 which detects current which flows into the field winding 20 is provided. An output signal of the current sensor 22 is inputted into the controller 30.

The field winding control unit 42 calculates a field current command value, based on the total torque command value and the like, and changes a field voltage command value so that the detection value of field winding current approaches the field current command value. Then, the field winding control unit 42 controls on/off the plurality of switching devices of the converter 21 by PWM control, based on the field voltage command value.

5. Embodiment 5

The controller 30 for rotary machine according to Embodiment 5 will be explained with reference to drawings.

The explanation for constituent parts the same as those in Embodiment 4 will be omitted. The basic configuration of the rotary machine 1 and the controller 30 for rotary machine according to the present embodiment is the same as that of Embodiment 4. The field winding 20 which generates the field of the rotor is provided, and the controller 30 is provided with the field winding control unit 42. However, Embodiment 5 is different from Embodiment 4 in that the field of the field winding 20 is strengthened in order to make the voltage utilization factor increase.

Then, in the present embodiment, when the average voltage utilization factor if not performing correction by a field winding correction value is less than the threshold value Mth, the distribution unit 31 calculates the field winding correction value which strengthens the field of the rotor so that the average voltage utilization factor in the case of performing correction by the field winding correction value becomes greater than or equal to the threshold value Mth. Then, the distribution unit 31 corrects the field voltage command value by the field winding correction value, and calculates the utilization factor setting command which makes the utilization factor ratio R12 change from 1 to 1. On the other hand, when the average voltage utilization factor if not performing correction by the field winding correction value is greater than or equal to the threshold value Mth, similar to Embodiment 4, the distribution unit 31 does not correct the field voltage command value by the field winding correction value, but calculates the utilization factor setting command which makes the utilization factor ratio R12 change from 1 to 1.

According to this configuration, even when the average voltage utilization factor if not performing correction by the field winding correction value is less than the threshold value Mth, the average voltage utilization factor is increased to the threshold value Mth or more by the field winding correction which strengthens the field of the rotor, one set of voltage utilization factor can be increased more than the case where the field winding correction is not performed, and the effective value of the bus line AC component can be decreased.

<Flowchart>

With reference to the flowchart of FIG. 14, detailed processing of the distribution unit 31 according to the present embodiment will be explained. In the step S31, similarly to the step S01 of Embodiment 1, the distribution unit 31 sets the reference values of first set of current command values of dq-axis Id1$o$0, Iq1$o$0 and the reference values of second set of current command values of dq-axis Id2$o$0, Iq2$o$0 which are set when assuming that the utilization factor ratio R12 is set to 1 to 1 and a correction by the field current correction value ΔIf is not performed.

In the step S32, similarly to the step S02 of Embodiment 1, the distribution unit 31 calculates the average voltage utilization factor in reference state Mave0 of the first set of voltage utilization factor and the second set of voltage utilization factor corresponding to the reference values of first set of current command values of dq-axis Id1$o$0, Iq1$o$0 and the reference values of second set of current command values of dq-axis Id2$o$0, Iq2$o$0.

In the step S33, similarly to the step S03 of Embodiment 1, the distribution unit 31 determines whether or not the average voltage utilization factor Mave0 in the reference state where the correction by the field current correction value ΔIf is not performed is greater than or equal to the threshold value Mth. When it is greater than or equal to the threshold value Mth, it advances to the step S34, and when it is less than the threshold value Mth, it advances to the step S37. In the present embodiment, the threshold value Mth is set to 50% of the maximum voltage utilization factors (in this example, 100%) in a range of the voltage utilization factor to be set.

Since the processing from step S34 to the step S36 is the same as the step S04 to the step S06 of Embodiment 1, explanation is omitted. But, the magnetic flux Ta of the rotor changes according to the field winding current If.

In the step S37, the distribution unit 31 calculates the field current correction value ΔIf which strengthens the field of the rotor so that the average voltage utilization factor Mavecr in the case of performing correction by the field current correction value ΔIf becomes greater than or equal to the threshold value Mth. For example, as shown in the next equation, the distribution unit 31 calculates the field current correction value ΔIf so that the reference value of first set of voltage utilization factor M10$cr$ after field winding correction calculated based on the field current command value Ifo+ΔIf after the field winding correction obtained by adding field current correction value ΔIf, and the reference values of first set of current command values of dq-axis Id1$o$0, Iq1$o$0 coincides with the threshold value Mth. The field current command value Ifo is a reference value calculated based on the total torque command value and the like. For example, by iterative calculation, the field current correction value ΔIf which satisfies the equation (21) is searched. Herein, the magnetic flux Ψa of the rotor is a function of the field winding current. Alternatively, using an algebraic equation or a map data which uses the field current command value Ifo, the reference values of first set of current command values of dq-axis Id1$o$0, Iq1$o$0, the rotational angle speed c), and the DC voltage Vdc as arguments, the field current correction value ΔIf may be calculated. The field current correction value ΔIf becomes a positive value. The field current correction value ΔIf is upper-limited by an upper limit value.

[Equation 21]

$$\begin{bmatrix} V_{d10cr} \\ V_{q10cr} \end{bmatrix} = \begin{bmatrix} R & -\omega L_q \\ \omega L_d & R \end{bmatrix} \begin{bmatrix} I_{d1o0} \\ I_{q1o0} \end{bmatrix} + \begin{bmatrix} 0 \\ \omega \Psi_a(I_{fo} + \Delta I_f) \end{bmatrix} \quad (21)$$

$$M_{10cr} = \frac{\sqrt{2}\sqrt{V_{d10cr}^2 + V_{q10cr}^2}}{V_{dc}} = M_{th}$$

Figure 15:
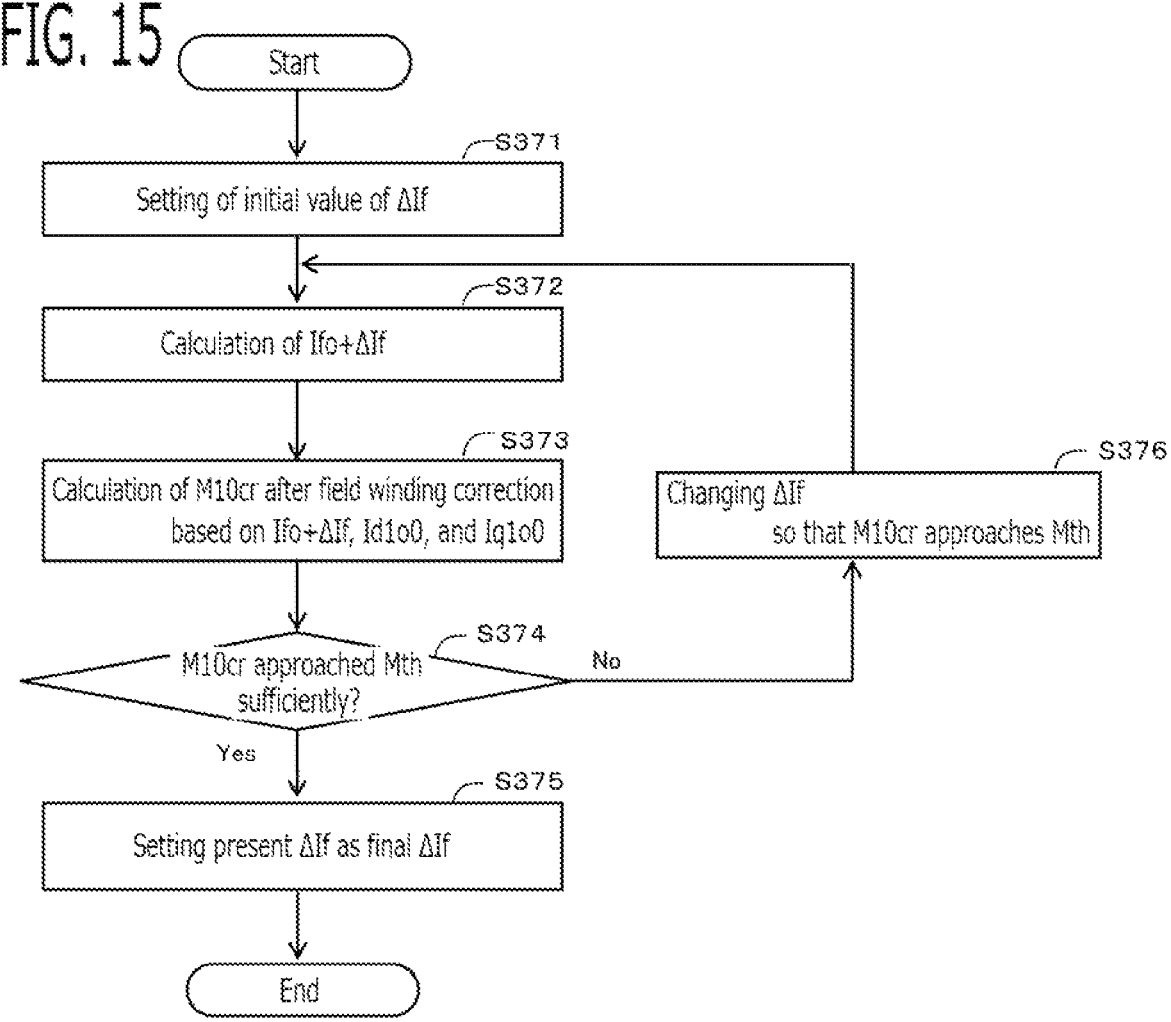
FIG. 15 is a flowchart explaining processing of iterative calculation of the distribution unit according to Embodiment 5.

An example in the case of performing iterative calculation will be explained with reference to the flowchart of FIG. 15. In the step S371, the distribution unit 31 sets the initial value (in this example, 0) of the field current correction value ΔIf. Then, in the step S372, the distribution unit 31 calculates the field current command value Ifo+ΔIf after field winding correction by adding the present field current correction value ΔIf to the field current command value Ifo.

Then, in the step S373, using the equation (21), the distribution unit 31 calculates the reference value of the first set of voltage utilization factor M10$cr$ after field winding correction, based on the field current command value Ifo+ΔIf after field winding correction, and the reference values of first set of current command values of dq-axis Id1$o$0, Iq1$o$0.

In the step S374, the distribution unit 31 determines whether or not the reference value of first set of voltage utilization factor M10$cr$ after field winding correction approaches the threshold value Mth sufficiently (for example, determines whether or not an absolute value of deviation became less than or equal to a determination value). When determining that it approaches sufficiently, it advances to the step S375, and when determining that it does not approach sufficiently, it advances to the step S376. In the step S376, the distribution unit 31 changes the field current correction value ΔIf so that the reference value of first set of voltage utilization factor M10cr after field winding correction approaches the threshold value Mth. After that, it returns to the step S372 and continues the iterative calculation. On the other hand, in the step S375, the distribution unit 31 sets the present field current correction value ΔIf as the final field current correction value ΔIf, and ends the iterative calculation. The field winding control unit 42 changes the field voltage command value so that the detection value of field winding current approaches the field current command value Ifo+ΔIf after addition of the field current correction value ΔIf.

Figure 14:
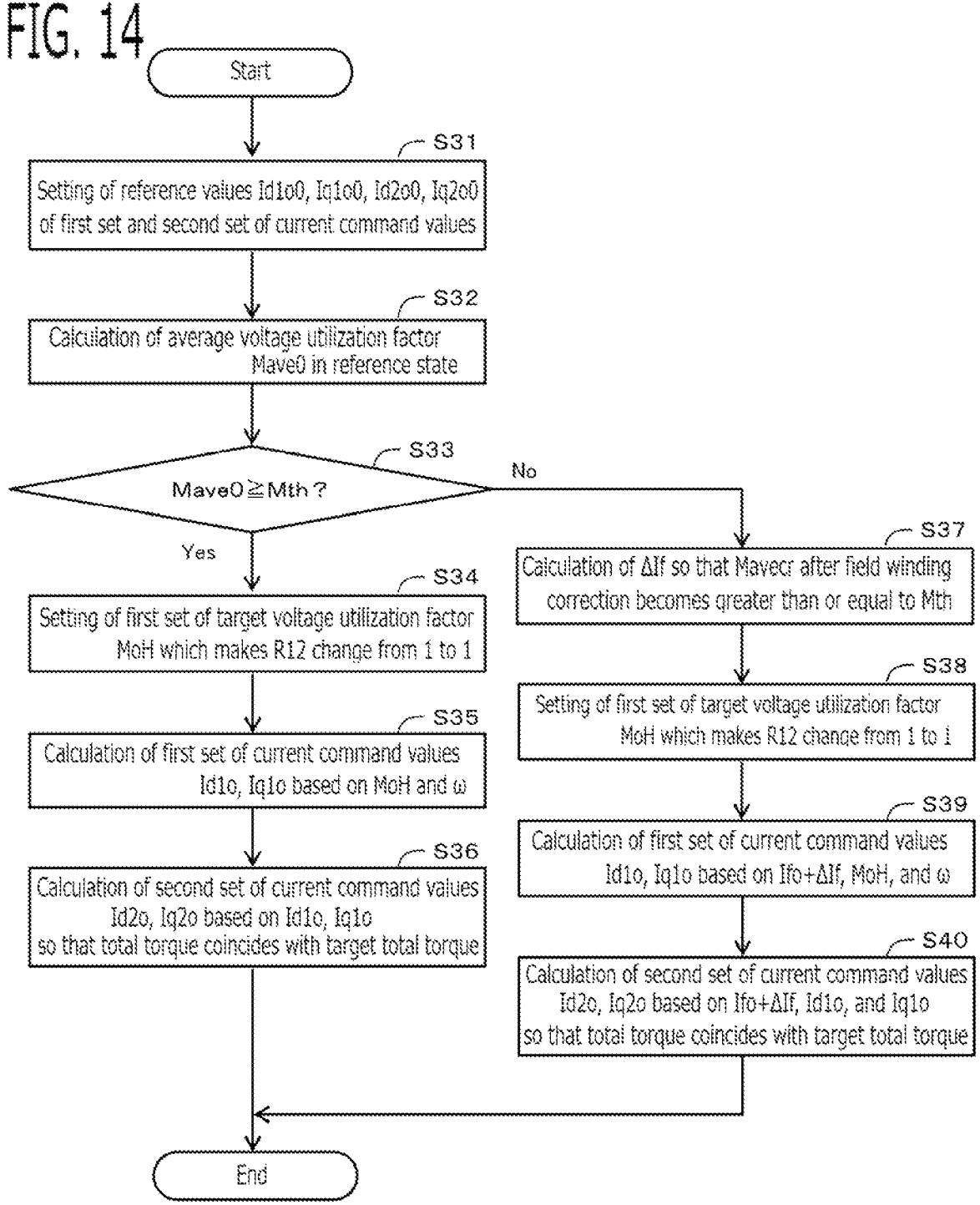
FIG. 14 is a flowchart explaining processing of the distribution unit according to Embodiment 5.

It returns to FIG. 14, in the step S38, the distribution unit 31 sets the first set of target voltage utilization factor MoH, based on the average voltage utilization factor in reference state Mave0, so that the first set of voltage utilization factor M1 becomes higher than the second set of voltage utilization factor M2. In the present embodiment, the distribution unit 31 sets the first set of target voltage utilization factor MoH to a double value of the threshold value Mth (in this example, 100%).

In the step S39, the distribution unit 31 calculates the first set of current command values of dq-axis Id1o, Iq1o, based on the field current command value Ifo+ΔIf after field winding correction, the first set of target voltage utilization factor MoH, and the rotational angle speed ω of the rotor, so that the first set of voltage utilization factor M1cr of applied voltages after field winding correction coincides with the first set of target voltage utilization factor MoH.

[Equation 22]

$$\begin{bmatrix} V_{d1o} \\ V_{q1o} \end{bmatrix} = \begin{bmatrix} R & -\omega L_q \\ \omega L_d & R \end{bmatrix} \begin{bmatrix} I_{d1o} \\ I_{q1o} \end{bmatrix} + \begin{bmatrix} 0 \\ \omega \Psi_a(I_{fo} + \Delta I_f) \end{bmatrix} \quad (22)$$

$$M_{1cr} = \frac{\sqrt{2}\sqrt{V_{d1o}^2 + V_{q1o}^2}}{V_{dc}} = M_{oH}$$

Although equation derivation is omitted, when the equation (22) is rearranged with regard to Iq1o, similarly to the equation (9), a quadratic function of Iq1o is obtained, and a calculation equation of each order coefficient a, b, c is obtained. Then, similarly to Embodiment 1, using the calculation equation of each order coefficient a, b, c and the equation (10), the distribution unit 31 calculates the first set of current command value of q-axis Iq1o, based on the field current command value Ifo+ΔIf after field winding correction, the first set of target voltage utilization factor MoH, the rotational angle speed ω, and the DC voltage Vdc. The distribution unit 31 sets the first set of current command value of d-axis Id1o to 0.

If the rotary machine 1 is a salient pole machine and the maximum torque/current control or the magnetic flux weakening control is performed, when the equation (11) or the equation (12) is substituted for the first set of current command value of d-axis Id1o of the equation (22) and it is rearranged with regard to Iq1o, similarly, a quadratic function of Iq1o is obtained, and a calculation equation of each order coefficient a, b, c is obtained. Then, using the calculation equation of each order coefficient a, b, c and the equation (10), the distribution unit 31 calculates the first set of current command value of q-axis Iq1o, based on the field current command value Ifo+ΔIf after field winding correction, the first set of target voltage utilization factor MoH, the rotational angle speed ω, and the DC voltage Vdc. Then, using the equation (11) or the equation (12), the distribution unit 31 calculates the first set of current command value of d-axis Id1o.

Alternatively, similarly to Embodiment 1, as shown in the next equation, by referring to a q-axis current setting map data MAPiq in which a relation between the field current command value Ifo+ΔIf after field winding correction, the target voltage utilization factor MoH, the rotational angle speed ω, the DC voltage Vdc, and the first set of current command value of q-axis Iq1o is preliminarily set, the distribution unit 31 may calculate the first set of current command value of q-axis Iq1o after current correction corresponding to the actual field current command value Ifo+ΔIf after field winding correction, the actual target voltage utilization factor MoH, the actual rotational angle speed ω, and the actual DC voltage Vdc. By referring to a d-axis current setting map data MAPid in which a relation between the field current command value Ifo+ΔIf after field winding correction, the target voltage utilization factor MoH, the rotational angle speed ω, the DC voltage Vdc, and the first set of current command value of d-axis Id1o is preliminarily set, the distribution unit 31 may calculate the first set of current command value of d-axis Id1o corresponding to the actual field current command value Ifo+ΔIf after field winding correction, the actual target voltage utilization factor MoH, the actual rotational angle speed ω, and the actual DC voltage Vdc.

[Equation 23]

$$I_{q1o} = MAPiq(I_{fo} + \Delta I_f, M_{oH}, \omega, V_{dc})$$

$$I_{d1o} = MAPid(I_{fo} + \Delta If, M_{oH}, \omega, V_{dc}) \quad (23)$$

In the step S40, the distribution unit 31 calculates the second set of current command values of dq-axis Id2o, Iq2o after field winding correction, based on the field current command value Ifo+ΔIf after field winding correction, and the first set of current command values of dq-axis Id1o, Iq1o, so that the total torque of the first set of torque and the second set of torque coincides with the total torque command value. Since it is similar to the step S06 of Embodiment 1 except calculation of the magnetic flux Ψa of the rotor based on the field current command value Ifo+ΔIf after field winding correction, explanation is omitted.

If the average voltage utilization factor is increased in a region where the average voltage utilization factor before field winding correction is low, the field current correction value ΔIf becomes large too much. Accordingly, in a region where the average voltage utilization factor before field winding correction is less than or equal to a predetermined value (for example, 20%), the field winding correction may be not performed, and the utilization factor ratio R12 may be set to 1 to 1.

The magnetic flux strengthening by the current correction value of d-axis ΔId of Embodiment 3, and the field strengthening by the field current correction value ΔIf of the present embodiment may be performed at the same time. In this case, the increase in the average voltage utilization factor by the current correction value of d-axis ΔId, and the increase in the average voltage utilization factor by the field current correction value ΔIf are shared appropriately.

6. Embodiment 6

The controller 30 for rotary machine according to Embodiment 6 will be explained with reference to drawings.

The explanation for constituent parts the same as those in Embodiment 1 will be omitted. The basic configuration of the rotary machine 1 and the controller 30 for rotary machine according to the present embodiment is the same as that of Embodiment 1. The phase setting of the first set and the second set of carrier waves, and the setting of the threshold value Mth are different from Embodiment 1.

<PWM Control of First Set>

Figure 16:
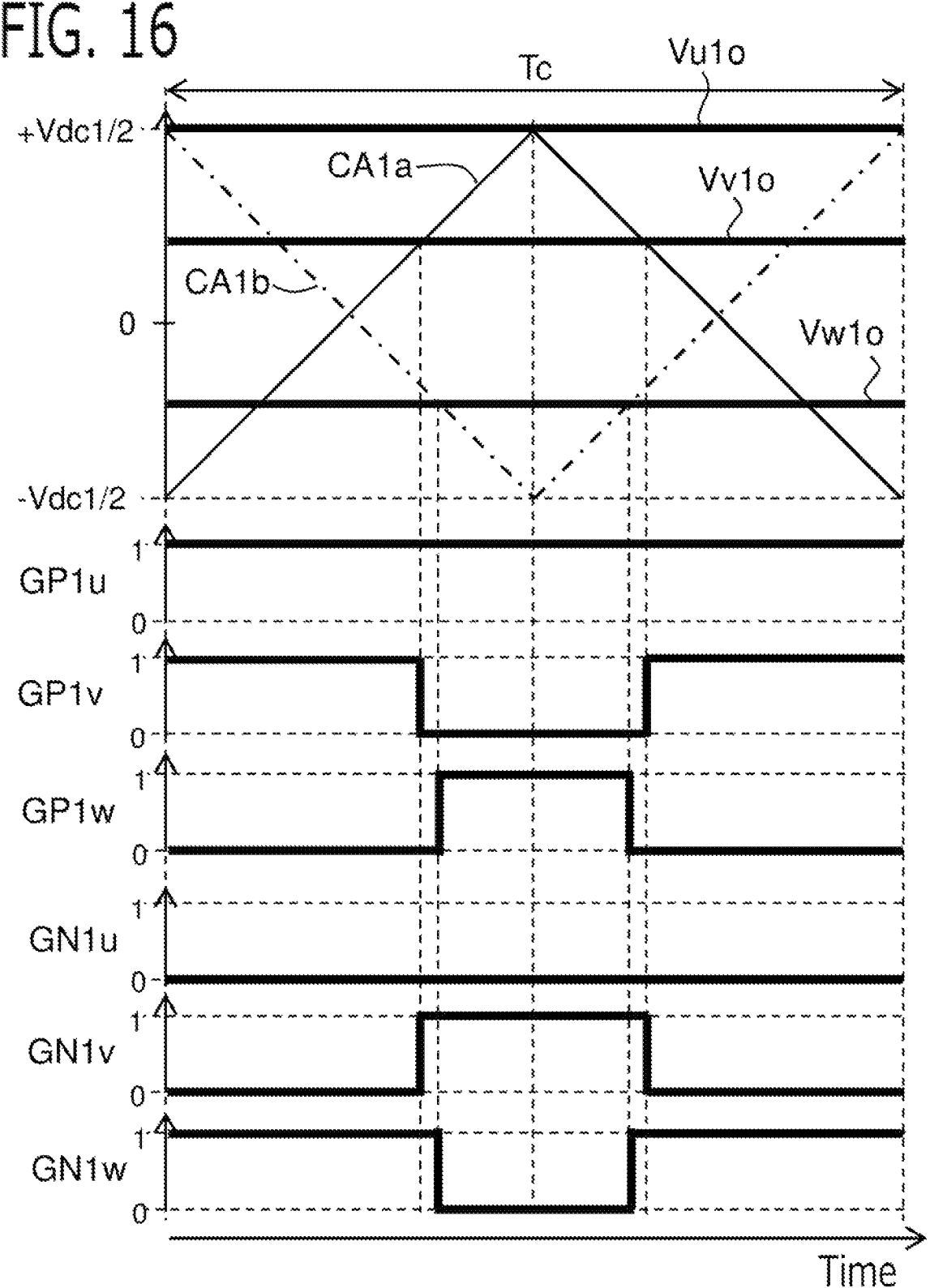
FIG. 16 is a time chart explaining the carrier wave comparison PWM control according to Embodiment 6.

Similarly to Embodiment 1, the first set switching control unit 36 compare each of the first set of three-phase voltage command values Vu1o, Vv1o, Vw1o with first set of carrier wave CA1, and turns on and off the plurality of switching devices based on the comparison result. Unlike Embodiment 1, as shown in FIG. 16, among the first set of three-phase voltage command values Vu1o, Vv1o, Vw1o, switching of one phase (in this example, U1 phase) in which the current absolute value becomes the maximum is stopped; and the first set of carrier wave CA1a (referred to as first set of first carrier wave CA1a) compared with the voltage command value of specific phases (in this example, U1 phase and V1 phase), and the first set of carrier wave CA1b (referred to as first set of second carrier wave CA1b) compared with the voltage command value of a phase other than the specific phases (in this example, W1 phase) are mutually reverse phases. The first set of first and second carrier waves CA1a, CA1b are mutually reverse phases, and are triangular waves which vibrate with an amplitude of half value Vdc1/2 of DC voltage centering on 0, at the PWM period Tc. Any waveforms, such as a saw tooth wave, may be used other than the triangular wave.

About U1 phase and V1 phase which is the specific phases, the first set switching control unit 36 turn on switching signal GP1 of the high potential side switching device, when the first set of first carrier wave CA1a is less than the voltage command value; and turns off the switching signal GP1 of the high potential side switching device, when the first set of first carrier wave CA1a exceeds the voltage command value. On the other hand, about U1 phase and V1 phase, the first set switching control unit 36 turn off the switching signal GN1 of the low potential side switching device, when the first set of first carrier wave CA1a is less than the voltage command value; and turns on the switching signal GN1 of the low potential side switching device, when the first set of first carrier wave CA1a exceeds the voltage command value.

About W1 phase which is the phase other than the specific phases, the first set switching control unit 36 turn on the switching signal GP1 of the high potential side switching device, when the first set of second carrier wave CA1b is less than the voltage command value; and turns off the switching signal GP1 of the high potential side switching device, when the first set of second carrier wave CA1b exceeds the voltage command value. On the other hand, about W1 phase, the first set switching control unit 36 turn off the switching signal GN1 of the low potential side switching device, when the first set of second carrier wave CA1b is less than the voltage command value; and turns on the switching signal GN1 of the low potential side switching device, when the first set of second carrier wave CA1b exceeds the voltage command value. Herein, the case of the current phase which becomes Vu1o>Vv1o>Vw1o was described. But, according to the current phase, the switching state may be controlled by the well-known method of patent document 3.

<PWM Control of Second Set>

Similarly to Embodiment 1, the second set switching control unit 41 compare each of the second set of three-phase voltage command values Vu2o, Vv2o, Vw2o with the second sets of carrier wave CA2, and turns on and off the plurality of switching devices based on the comparison result. Unlike Embodiment 1, among the second set of three-phase voltage command values Vu2o, Vv2o, Vw2o, switching of one phase (in this example, U2 phase) in which the current absolute value becomes the maximum is stopped; and the second set of carrier wave CA2a (referred to as second set of first carrier wave CA2a) compared with the voltage command value of specific phases (in this example, U2 phase and V2 phase), and the second set of carrier wave CA2b (referred to as second set of second carrier wave CA2b) compared with the voltage command value of a phase other than the specific phases (in this example, W2 phase) are mutually reverse phases. The second set of first and second carrier waves CA2a, CA2b are mutually reverse phases, and are triangular waves which vibrate with an amplitude of half value Vdc2/2 of DC voltage centering on 0, at the PWM period Tc. Since processing of the second set switching control unit 41 is similarly to processing of the first set switching control unit 36, explanation is omitted.

<Change of Utilization Factor Ratio R12>

Figure 17:
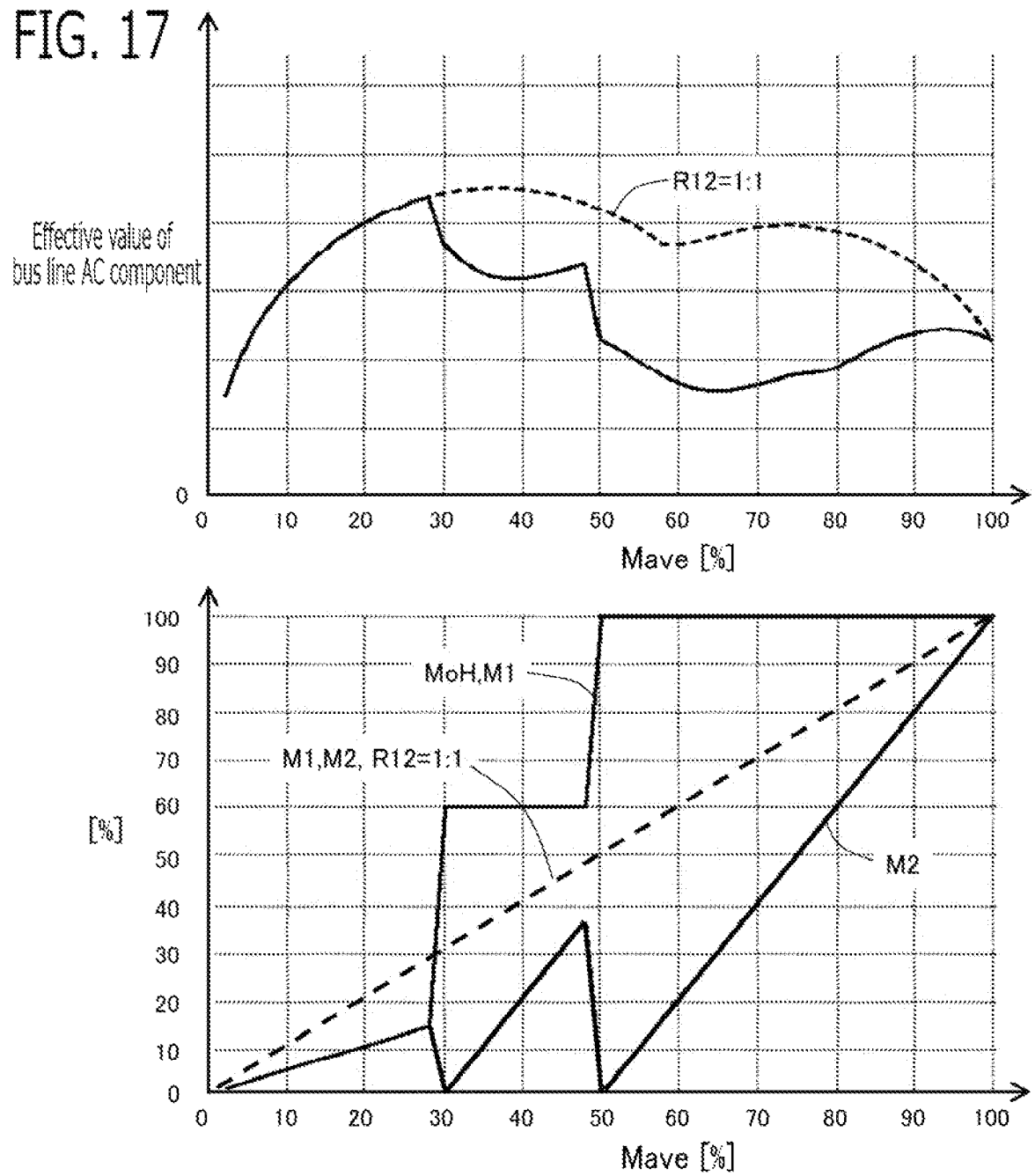
FIG. 17 is a figure explaining setting of the effective value of the bus line AC component and the voltage utilization factor with respect to the average voltage utilization factor in the case where the utilization factor ratio is not changed from 1 to 1 and the case where the utilization factor ratio is changed from 1 to 1, according to Embodiment 6.

In the upper stage graph of FIG. 17, a dashed line shows a characteristic of change of the effective value of the bus line AC component with respect to change of the average voltage utilization factor Mave in the case where the utilization factor ratio R12 is set to 1 to 1. In the lower stage graph of FIG. 17, a dashed line shows the voltage utilization factor of each set with respect to the average voltage utilization factor Mave in this case. When the average voltage utilization factor Mave is in the vicinity of 30%, the effective value of the bus line AC component becomes the first largest maximum. When the average voltage utilization factor Mave is in the vicinity of 70%, the effective value of the bus line AC component becomes the second largest maximum. When the average voltage utilization factor Mave is in the vicinity of 60%, the effective value of the bus line AC component becomes the minimum. When Mave=100% or 0%, the effective value of the bus line AC component becomes the minimum. This is because the carrier wave of specific two phases and the carrier wave of non-specific one phase are mutually reverse phases, about each set, in the present embodiment.

Similarly to Embodiment 1, when an average voltage utilization factor of the first set of voltage utilization factor and the second set of voltage utilization factor is greater than or equal to the threshold value Mth, the distribution unit 31 calculates the utilization factor setting command which makes the utilization factor ratio R12 change from 1 to 1. When the average voltage utilization factor is less than the threshold value Mth, the distribution unit 31 calculates the utilization factor setting command which makes the utilization factor ratio become 1 to 1.

The threshold value Mth is set (in this example, 30%) corresponding to the average voltage utilization factor at which the effective value of the bus line AC component becomes the maximum with respect to a change of the average voltage utilization factor Mave in a condition where the utilization factor ratio R12 is set to 1 to 1. For example, the threshold value Mth may be set within a range of +10 to −10% of the average voltage utilization factor at which it becomes the maximum.

<Flowchart>

Figure 18:
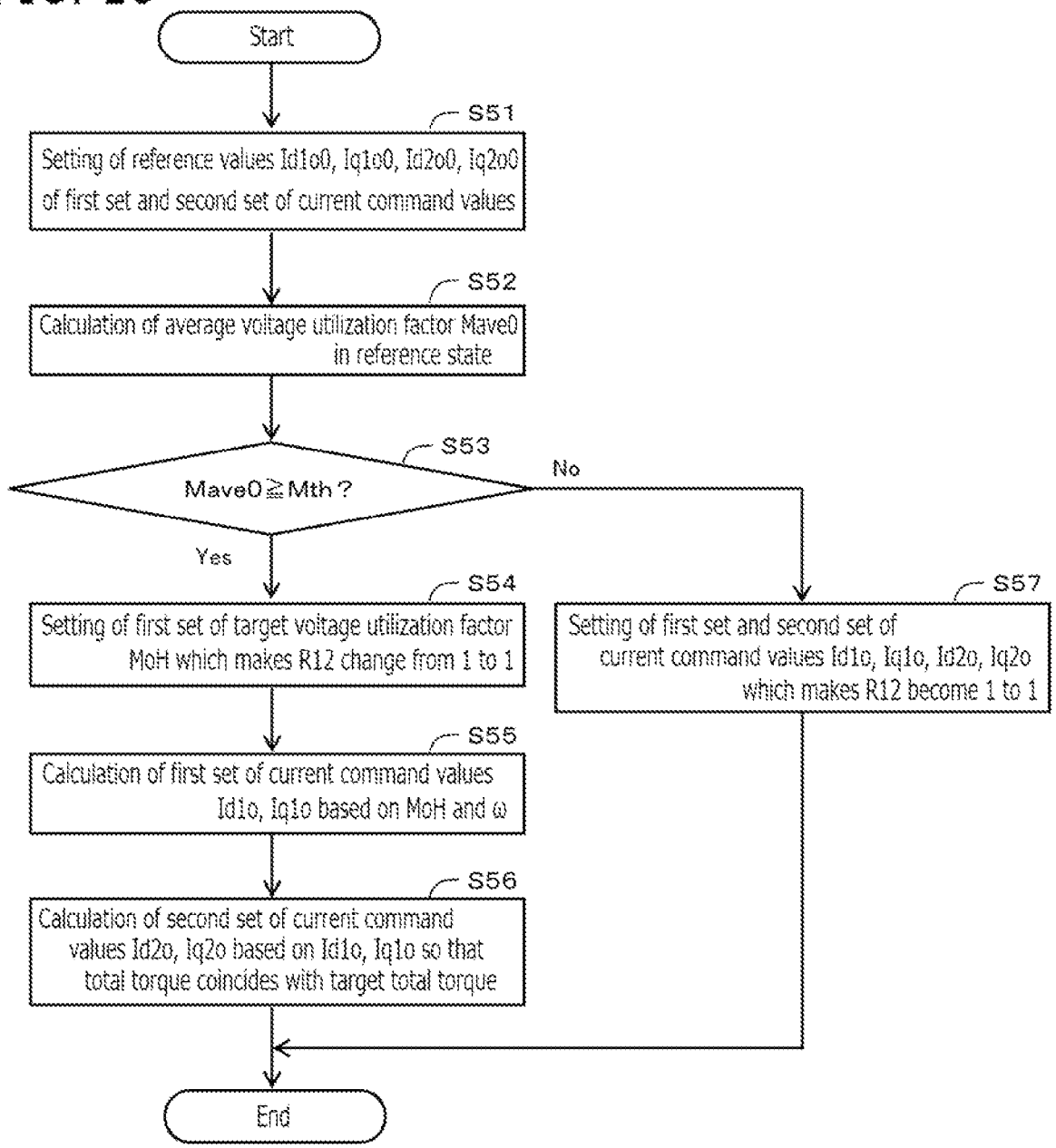
FIG. 18 is a flowchart explaining processing of the distribution unit according to Embodiment 6.

With reference to the flowchart of FIG. 18, detailed processing of the distribution unit 31 according to the present embodiment will be explained. In the step S51, similarly to the step S01 of Embodiment 1, the distribution unit 31 set the utilization factor ratio R12 to 1 to 1, and sets the reference values of first set of current command values of dq-axis Id1$o$0, Iq1$o$0, and the reference values of second set of current command values of dq-axis Id2$o$0, Iq2$o$0.

In the step S52, similarly to the step S02 of Embodiment 1, the distribution unit 31 calculates the average voltage utilization factor in reference state Mave0 of the first set of voltage utilization factor and the second set of voltage utilization factor corresponding to the reference values of first set of current command values of dq-axis Id1$o$0, Ig1$o$0 and the reference values of second set of current command values of dq-axis Id2$o$0, Iq2$o$0.

In the step S53, similarly to the step S03 of Embodiment 1, the distribution unit 31 determines whether or not the average voltage utilization factor in reference state Mave0 is greater than or equal to the threshold value Mth (in this example, 30%). When it is greater than or equal to the threshold value Mth, it advances to the step S54, and when it is less than the threshold value Mth, it advances to the step S57.

In the step S54, similarly to the step S04 of Embodiment 1, the distribution unit 31 sets the first set of target voltage utilization factor MoH, based on the average voltage utilization factor in reference state Mave0, so that the first set of voltage utilization factor M1 becomes higher than the second set of voltage utilization factor M2. In the present embodiment, as shown in the lower row graph of FIG. 17, when the average voltage utilization factor in reference state Mave0 is greater than or equal to the threshold value Mth (in this example, 30%) and is less than 50% of the maximum voltage utilization factor (in this example, 100%) (30%<=Mave0<50%), the distribution unit 31 sets the first set of target voltage utilization factor MoH (in this example, 60%) corresponding to the average voltage utilization factor at which the change of the effective value of the bus line AC component becomes the minimum with respect to the change of the average voltage utilization factor Mave in a condition where the utilization factor ratio R12 is set to 1 to 1. For example, the first set of target voltage utilization factor MoH may be set within a range of +10 to −10% of the average voltage utilization factor at which it becomes the minimum. When the average voltage utilization factor in reference state Mave0 is greater than or equal to 50% of the maximum voltage utilization factor (in this example, 100%) (50%<=Mave0), the distribution unit 31 sets the first set of target voltage utilization factor MoH to the maximum voltage utilization factor (in this example, 100%).

In the step S55, similarly to the step S05 of Embodiment 1, the distribution unit 31 calculates the first set of current command values of dq-axis Id1$o$, Iq1$o$, based on the first set of target voltage utilization factor MoH and the rotational angle speed ω of the rotor, so that the first set of voltage utilization factor M1 of applied voltages coincides with the first set of target voltage utilization factor MoH.

In the step S56, similarly to the step S06 of Embodiment 1, the distribution unit 31 calculates the second set of current command values of dq-axis Id2$o$, Iq2$o$, based on the first set of current command values of dq-axis Id1$o$, Iq1$o$, so that the total torque of the first set of torque and the second set of torque coincides with the total torque command value.

On the other hand, in the step S57, similarly to the step S07 of Embodiment 1, the distribution unit 31 calculates the current command values of dq-axis of each set which make the utilization factor ratio R12 become 1 to 1. As shown in the equation (16), the distribution unit 31 sets the reference values of first set of current command values of dq-axis Id1$o$0, Ig1$o$0 as the first set of current command values of dq-axis Id1$o$, Iq1$o$; and sets the reference values of second set of current command values of dq-axis Id2$o$0, Iq2$o$0 as the second set of current command values of dq-axis Id2$o$, Ig2$o$.

In the upper stage graph of FIG. 17, a solid line shows the effective value of the bus line AC component in the case where the first set of target voltage utilization factor MoH is set to 60% or 100%. In the lower stage graph of FIG. 17, a solid line shows the voltage utilization factor of each set with respect to the average voltage utilization factor Mave in this case. In the case where the carrier wave of the specific phases and the carrier wave of non-specific one phase are mutually reverse phases, by changing the utilization factor ratio R12 from 1 to 1 in a region of the average voltage utilization factor Mave of 30% or more where the effective value of the bus line AC component becomes the maximum, the effective value of the bus line AC component can be decreased less than the case where the utilization factor ratio R12 is 1 to 1. When the average voltage utilization factor Mave is less than 50%, the effective value of the bus line AC component cannot be increased to 100% at which the first set of target voltage utilization factor MoH becomes the minimum. Accordingly, by setting the first set of target voltage utilization factor MoH to 60% at which the effective value of the bus line AC component becomes the minimum, the effective value of the bus line AC component generated in the first set can be reduced. When the average voltage utilization factor Mave is greater than or equal to 50%, the first set of target voltage utilization factor MoH is increased to 100% at which the effective value of the bus line AC component becomes the minimum, and the effective value of the bus line AC component generated by the first set can be minimized. Accordingly, the effective value of the total bus line AC component can be reduced significantly compared with the case where the utilization factor ratio R12 is set to 1 to 1.

As shown in FIG. 19, the distribution unit 31 may set the first set of target voltage utilization factor MoH which makes the first set of voltage utilization factor and the second set of voltage utilization factor change so that the effective value of the bus line AC component becomes minimum, at each operating point of the average voltage utilization factor Mave. A relation between the average voltage utilization factor Mave and the first set of target voltage utilization factor MoH so that the whole effective value of the bus line AC component becomes the minimum is previously determined by arithmetic operation or experiment. And, the target utilization factor setting map data like the solid line of the lower stage graph of FIG. 19 is preliminarily set. In this case, as shown in FIG. 19, even in the region where the average voltage utilization factor Mave is less than 30%, the utilization factor ratio R12 may be changed from 1 to 1.

In the case where the phase difference of the position of the second set of armature windings with respect to the position of the first set of armature windings is set to 30 degrees as shown in FIG. 9, in FIG. 20, a solid line shows the setting value of the voltage utilization factor of each set and the effective value of the bus line AC component which make the effective value of the bus line AC component become the minimum. For comparison, a dashed line shows the effective value of the bus line AC component and the voltage utilization factor of each set in the case of setting the utilization factor ratio R12 to 1 to 1. Even if the carrier waves of reverse phases are used, and the phase difference is other than 0 degree, by changing the utilization factor ratio R12 from 1 to 1, the effective value of the bus line AC component can be decreased.

7. Other Embodiments (1) In each of the above-mentioned embodiments, the application of the rotary machine was not specified. For example, the rotary machine 1 may be used as a driving force source of an electric power steering apparatus 100. As shown in FIG. 21, the electric power steering apparatus 100 is provided with the rotary machine 1, the controller 30 for rotary machine, the two sets of inverters 6a, 6b, and a driving force transmission mechanism 101 that transmits a driving force of the rotary machine 1 to a steering apparatus 102 of a vehicle.

A rotation axis of the rotor of the rotary machine 1 is connected with the steering apparatus 102 of the wheels 103 via the driving force transmission mechanism 101. For example, the electric power steering apparatus 100 is provided with a handle 104 that a driver rotates right and left, a shaft 105 that is connected with the handle 104 and transmits a steering wheel torque by the handle 104 to the steering apparatus 102 of the wheels 103, a torque sensor 106 that is mounted on the shaft 105 and detects a steering torque Ts by the handle 104, and a driving force transmission mechanisms 101, such as a worm gear mechanism, which connects the rotation axis of the rotary machine 1 with the shaft 105. The output signal of the torque sensor 106 is inputted into the controller 30 (the input circuit 92). The controller 30 (for example, distribution unit 31) calculates the total torque command value or the total current command value of q-axis based on the steering torque Ts detected based on the output signal of the torque sensor 106.

Alternatively, the rotary machine 1 may be a driving force source of various kinds of apparatuses other than the electric power steering apparatus 100. For example, the rotary machine 1 may be a driving force source of the wheel of a vehicle, a driving force source of an elevator, a driving force source of an airplane, and the like.

(2) In each of the above-mentioned embodiments, the first set and the second set of three-phase armature windings were provided. However, the first set and the second set of the armature windings of plural-phase (for example, two-phase, four-phase) other than three-phase may be provided.

(3) In each of the above-mentioned embodiments, the amplitude reduction modulation was performed and the maximum voltage utilization factor in the range of the voltage utilization factor to be set was 100%. However, the amplitude reduction modulation may not be performed, and the maximum voltage utilization factor may be 86.6%. Alternatively, the maximum voltage utilization factor may be set from 100% to 110%, and the overmodulation may be performed.

(4) In each of the above-mentioned embodiments, the distribution unit 31 calculated the first set of current command value and the second set of current command value as the utilization factor setting command. However, the distribution unit 31 may calculate any parameters related to setting of the first set of voltage utilization factor and the second set of voltage utilization factor as the utilization factor setting command. For example, the distribution unit 31 may calculate a correction value of the first set of voltage command values of dq-axis, and a correction value of the second set of voltage command values as the utilization factor setting command; and may correct the voltage command values of dq-axis of each set.

(5) In each of the above-mentioned embodiments, when the average voltage utilization factor is in the predetermined range, the distribution unit 31 changed the utilization factor ratio R12 from 1 to 1. However, when the operating condition of the rotary machine 1, such as the rotational angle speed ω, is in a predetermined range, the heat generation of the smoothing capacitor 5 and the like may become problem, and the effective value of the bus line AC component may be reduced. Accordingly, when the operating condition of the rotary machine 1, such as the rotational angle speed ω, is in a predetermined range, the distribution unit 31 may change the utilization factor ratio R12 from 1 to 1. The distribution unit 31 may not change one set of voltage utilization factor to the maximum voltage utilization factor (100%); and may change one set of voltage utilization factor to the voltage utilization factor which is less than the maximum voltage utilization factor and at which the effective value of the bus line AC component becomes less than or equal to an acceptable value.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Rotary Machine, 5: DC power Source, 6a: First set of inverter, 6b: Second set of inverter, 7: Bus Line, 20: Field Winding, 30: Controller for rotary machine, 31: Distribution Unit, 35: First Set Voltage Command Calculation Unit, 36: First Set Switching Control Unit, 40: Second Set Voltage Command Calculation Unit, 41: Second Set Switching Control Unit, 42: Field Winding Control Unit, MoH: Target voltage utilization factor, Mth: Threshold value, R12: Utilization factor ratio

What is claimed is:

1. A controller for rotary machine which controls a rotary machine which has two sets of plural-phase armature windings, via two sets of inverters connected to the same DC power source, the controller for rotary machine comprising at least one processor configured to implement:
   a distributer that calculates an utilization factor setting command related to setting of a first set of voltage utilization factor which is a ratio of an amplitude of a fundamental wave component of line voltages of applied voltages of first set of plural-phase armature windings with respect to a power source voltage of the DC power source, and a second set of voltage utilization factor which is a ratio of an amplitude of a fundamental wave component of line voltages of applied voltages of second set of plural-phase armature windings with respect to the power source voltage;
   a first set voltage command calculator that calculates first set of plural-phase voltage command values, based on the utilization factor setting command;
   a second set voltage command calculator that calculates second set of plural-phase voltage command values, based on the utilization factor setting command; and a first set switching controller that turns on and off a plurality of switching devices provided in the first set of inverter, based on the first set of plural-phase voltage command values, and applies voltages to the first set of plural-phase armature windings;

a second set switching controller that turns on and off a plurality of switching devices provided in the second set of inverter, based on the second set of plural-phase voltage command values, and applies voltages to the second set of plural-phase armature windings, wherein the distributer calculates the utilization factor setting command which makes an utilization factor ratio between the first set of voltage utilization factor and the second set of voltage utilization factor change from 1 to 1 so that an effective value of a bus line AC component which is an AC component superimposed on a bus current which flows through a bus line connecting between the DC power source and the two set of inverters becomes lower than a case where the utilization factor ratio is 1 to 1.

2. The controller for rotary machine according to claim 1, wherein, when making the utilization factor ratio change from 1 to 1, the distributer calculates the utilization factor setting command which makes the utilization factor ratio change from 1 to 1 so that the effective value of the bus line AC component becomes the minimum.

3. The controller for rotary machine according to claim 1, wherein, when an average voltage utilization factor of the first set of voltage utilization factor and the second set of voltage utilization factor is greater than or equal to a threshold value, the distributer calculates the utilization factor setting command which makes the utilization factor ratio change from 1 to 1, and when the average voltage utilization factor is less than the threshold value, the distributer calculates the utilization factor setting command which makes the utilization factor ratio become 1 to 1.

4. The controller for rotary machine according to claim 3, wherein the threshold value is set corresponding to the average voltage utilization factor at which the effective value of the bus line AC component becomes the maximum with respect to a change of the average voltage utilization factor in a condition where the utilization factor ratio is set to 1 to 1.

5. The controller for rotary machine according to claim 3, wherein the threshold value is set to 50% of a maximum voltage utilization factor in a range of the voltage utilization factor to be set.

6. The controller for rotary machine according to claim 3, wherein the first set switching controller compares each of the first set of plural-phase voltage command values with a first set of carrier wave, and turns on and off the plurality of switching devices provided in the first set of inverter, based on a comparison result, wherein the first set of carrier wave which is compared with each of the first set of plural-phase voltage command values is the same carrier wave, wherein the second set switching controller compares each of the second set of plural-phase voltage command values with a second set of carrier wave, and turns on and off the plurality of switching devices provided in the second set of inverter, based on a comparison result, wherein the second set of carrier wave which is compared with each of the second set of plural-phase voltage command values is the same carrier wave, and wherein the threshold value is set to 50%.

7. The controller for rotary machine according to claim 3, wherein the first set switching controller compares each of the first set of plural-phase voltage command values with a first set of carrier wave, and turns on and off the plurality of switching devices provided in the first set of inverter, based on a comparison result, wherein the first set of carrier wave compared with the voltage command value of a specific phase among the first set of plural-phase voltage command values, and the first set of carrier wave compared with the voltage command values of phases other than the specific phase are mutually reverse phases, wherein the second set switching controller compares each of the second set of plural-phase voltage command values with a second set of carrier wave, and turns on and off the plurality of switching devices provided in the second set of inverter, based on a comparison result, wherein the second set of carrier wave compared with the voltage command value of a specific phase among the second set of plural-phase voltage command values, and the second set of carrier wave compared with the voltage command values of phases other than the specific phase are mutually reverse phases, and wherein the threshold value is set to 30%.

8. The controller for rotary machine according to claim 1, wherein, when making the utilization factor ratio change from 1 to 1, the distributer calculates the utilization factor setting command so that one set of voltage utilization factor among the first set of voltage utilization factor and the second set of voltage utilization factor becomes a maximum voltage utilization factor in a range of the voltage utilization factor to be set.

9. The controller for rotary machine according to claim 1, wherein, when making the utilization factor ratio change from 1 to 1, the distributer calculates the utilization factor setting command so that a total torque of a first set of torque by a magnetic flux of the first set of plural-phase armature windings and a second set of torque by a magnetic flux of the second set of plural-phase armature windings coincides with a target total torque.

10. The controller for rotary machine according to claim 1, wherein the distributer calculates, as the utilization factor setting command, a first set of current command value about the first set of plural-phase armature windings, and a second set of current command value about the second set of plural-phase armature windings; and when making the utilization factor ratio change from 1 to 1, calculates the first set of current command value and the second set of current command value so that the utilization factor ratio changes from 1 to 1, wherein the first set voltage command calculator calculates the first set of plural-phase voltage command values, based on the first set of current command value, wherein the second set voltage command calculator calculates the second set of plural-phase voltage command values, based on the second set of current command value.

11. The controller for rotary machine according to claim 10, wherein, when making the utilization factor ratio change from 1 to 1, the distributer sets one set of target voltage utilization factor among the first set of voltage utilization factor and the second set of voltage utilization factor so that the one set of voltage utilization factor becomes higher than the other set of voltage utilization factor;

calculates one set of current command value, based on the one set of target voltage utilization factor and a rotational angle speed of rotor, so that the one set of voltage utilization factor coincides with the one set of target voltage utilization factor; and calculates the other set of current command value, based on the one set of current command value, so that a total torque of a first set of torque by a magnetic flux of the first set of plural-phase armature windings and a second set of torque by a magnetic flux of the second set of plural-phase armature windings coincides with a target total torque.

12. The controller for rotary machine according to claim 11, wherein the distributer sets a reference value of the first set of current command value and a reference value of the second set of current command value which are set when assuming that the utilization factor ratio is set to 1 to 1;

calculates an average voltage utilization factor of the first set of voltage utilization factor and the second set of voltage utilization factor corresponding to the reference value of the first set of current command value and the reference value of the second set of current command value; and when making the utilization factor ratio change from 1 to 1, sets the one set of target voltage utilization factor, based on the average voltage utilization factor.

13. The controller for rotary machine according to claim 11, wherein the distributer sets a reference value of the first set of current command value and a reference value of the second set of current command value which are set when assuming that the utilization factor ratio is set to 1 to 1; and calculates the other set of current command value, based on the one set of current command value, so that a total of the first set of current command value and the second set of current command value coincides with a total of the reference value of the first set of current command value and the reference value of the second set of current command value.

14. The controller for rotary machine according to claim 10, wherein, when making the utilization factor ratio change from 1 to 1, the distributer performs a limitation processing which limits one set of current command value among the first set of current command value and the second set of current command value, by a limit value; and changes the other set of current command value so that the other set of torque increases by a decrease amount of one set of torque decreased by limitation.

15. The controller for rotary machine according to claim 1, wherein the distributer calculates, as the utilization factor setting command, a first set of current command value about the first set of plural-phase armature windings, and a second set of current command value about the second set of plural-phase armature windings, wherein the first set voltage command calculator calculates the first set of plural-phase voltage command values, based on the first set of current command value, wherein the second set voltage command calculator calculates the second set of plural-phase voltage command values, based on the second set of current command value, wherein, when an average voltage utilization factor of the first set of voltage utilization factor and the second set of voltage utilization factor if not performing correction by a current correction value is less than a threshold value, the distributer calculates the current correction value which strengthens a magnetic flux of rotor so that the average voltage utilization factor after correction by the current correction value becomes greater than or equal to the threshold value, and calculates the first set of current command value and the second set of current command value which were corrected by the current correction value and make the utilization factor ratio change from 1 to 1; and when the average voltage utilization factor if not performing correction by the current correction value is greater than or equal to the threshold value, calculates the first set of current command value and the second set of current command value which are not corrected by the current correction value and make the utilization factor ratio change from 1 to 1.

16. The controller for rotary machine according to claim 1, further comprising a field winding controller that turns on and off a switching device based on a field voltage command value, and applies voltage to a field winding which generates a field of rotor, wherein, when an average voltage utilization factor of the first set of voltage utilization factor and the second set of voltage utilization factor if not performing correction by a field winding correction value is less than a threshold value, the distributer calculates the field winding correction value which strengthens the field of rotor so that the average voltage utilization factor after correction by the field winding correction value becomes greater than or equal to the threshold value, corrects the field voltage command value by the field winding correction value, and calculates the utilization factor setting command which makes the utilization factor ratio change from 1 to 1; and when the average voltage utilization factor if not performing correction by the field winding correction value is greater than or equal to the threshold value, does not correct the field voltage command value by the field winding correction value, and calculates the utilization factor setting command which makes the utilization factor ratio change from 1 to 1.

17. The controller for rotary machine according to claim 1, wherein the switching devices of each set are turned on and off, without synchronizing between the first set switching controller and the second set switching controller.

* * * * *